(12) United States Patent
Murray et al.

(10) Patent No.: US 11,443,932 B2
(45) Date of Patent: Sep. 13, 2022

(54) DEVICE FOR RAPID EXCHANGE OF ION SOURCES AND ION TRANSMISSION DEVICES

(71) Applicant: Micromass UK Limited, Wilmslow (GB)

(72) Inventors: Paul Murray, Manchester (GB); Mark Towers, Stockport (GB); Andrew Whatley, Manchester (GB); Matthew Henderson, Stockport (GB); Philippa Hart, Chester (GB); Emmanuelle Claude, Altrincham (GB); Richard Jarrold, Chelford (GB); Jeff Brown, Hyde (GB); Steve Brace, Bollington (GB); Edward Scott, Knutsford (GB)

(73) Assignee: Micromass UK Limited, Wilmslow (GB)

( * ) Notice: Subject to any disclaimer, the term of this patent is extended or adjusted under 35 U.S.C. 154(b) by 137 days.

(21) Appl. No.: 16/956,922

(22) PCT Filed: Dec. 21, 2018

(86) PCT No.: PCT/GB2018/053747
§ 371 (c)(1),
(2) Date: Jun. 22, 2020

(87) PCT Pub. No.: WO2019/122921
PCT Pub. Date: Jun. 27, 2019

(65) Prior Publication Data
US 2020/0395203 A1    Dec. 17, 2020

(30) Foreign Application Priority Data

Dec. 22, 2017 (GB) ...................... 1721834
Dec. 22, 2017 (GB) ...................... 1721836

(51) Int. Cl.
*H01J 49/00* (2006.01)
*H01J 49/06* (2006.01)
(Continued)

(52) U.S. Cl.
CPC .......... *H01J 49/065* (2013.01); *G01N 27/622* (2013.01); *H01J 49/0031* (2013.01);
(Continued)

(58) Field of Classification Search
CPC .. H01J 49/065; H01J 49/0031; H01J 49/0495; H01J 49/24; H01J 49/26;
(Continued)

(56) References Cited

U.S. PATENT DOCUMENTS

2006/0016983 A1* 1/2006 Kobayashi ............ H01J 49/401
250/288

FOREIGN PATENT DOCUMENTS

EP    1267387 A2    12/2002
GB    2416242 A     1/2006
(Continued)

OTHER PUBLICATIONS

Search Report under Section 17(5) for United Kingdom Patent Application No. GB1721834.8, dated Jun. 25, 2018, 4 pages.
(Continued)

*Primary Examiner* — Michael Maskell
(74) *Attorney, Agent, or Firm* — Goodwin Procter LLP

(57) ABSTRACT

A mass spectrometer is disclosed comprising a rotatable isolation valve (1) having a curved, spherical, cylindrical or concave portion. At least a portion of an ion guide (2) is positioned so as to extend within a swept volume of the isolation valve (1) enabling the ion guide (2) to be positioned close to a second downstream ion guide (3) and for ions to
(Continued)

be transmitted from the first (2) ion guide to the second ion guide (3) with high ion transmission efficiency.

19 Claims, 7 Drawing Sheets

(51) Int. Cl.
  *G01N 27/622* (2021.01)
  *H01J 49/04* (2006.01)
  *H01J 49/24* (2006.01)
  *H01J 49/26* (2006.01)
(52) U.S. Cl.
  CPC .......... *H01J 49/0495* (2013.01); *H01J 49/24* (2013.01); *H01J 49/26* (2013.01)
(58) Field of Classification Search
  CPC ...... H01J 49/4225; H01J 49/062; H01J 49/04; H01J 49/068; G01N 27/622; F16K 1/2014; F16K 51/02
  USPC ......................................... 250/281, 282, 287
  See application file for complete search history.

(56) References Cited

FOREIGN PATENT DOCUMENTS

| | | | |
|---|---|---|---|
| GB | 2485308 A | | 5/2012 |
| JP | H04137448 A | | 5/1992 |
| JP | 2007103300 A | * | 4/2007 |
| JP | 2007103300 A | | 4/2007 |
| WO | 2010/36824 A2 | | 4/2010 |

OTHER PUBLICATIONS

International Search Report and Written Opinion for International Patent Application No. PCT/GB2018/053747, dated May 22, 2019, 20 pages.

* cited by examiner

DEVICE FOR RAPID EXCHANGE OF ION SOURCES AND ION TRANSMISSION DEVICES

CROSS-REFERENCE TO RELATED APPLICATIONS

This application is a national phase filing claiming the benefit of and priority to International Patent Application No. PCT/GB2018/053747, filed on Dec. 21, 2018, which claims priority from and the benefit of United Kingdom patent application No. 1721834.8, filed on Dec. 22, 2017 and United Kingdom patent application No. 1721836.3, filed on Dec. 22, 2017. The entire contents of these applications are incorporated herein by reference.

FIELD OF THE INVENTION

The present invention relates generally to the field of mass spectrometry.

BACKGROUND

Mass spectrometers comprising a Matrix Assisted Laser Desorption Ionisation ("MALDI") ion source are known. Matrix Assisted Laser Desorption Ionisation ("MALDI") mass spectrometry is a known process which is particularly suited for the analysis of non-volatile biomolecules. A suitable matrix material (e.g. an organic solvent) is added to a sample so that the sample becomes embedded in the matrix material. The embedded sample is then positioned on a metal plate and a laser pulse is directed on to the target sample. The laser pulse impinging upon the target sample causes analyte material to be ablated and desorbed from the target sample. Analyte ions are generated by analyte material being protonated or deprotonated in a hot plume of gaseous molecules which is released from the target. The matrix has a strong absorption at the wavelength of the laser pulse and acts as a proton source to encourage ionisation of the analyte. The gaseous plume which is released from the target comprises a mixture of analyte ions together with neutral particles. The mixture of analyte ions and neutral particles is then directed towards the inlet of a mass spectrometer. The analyte ions are separated from the neutral particles with the analyte ions being onwardly transmitted to a mass analyser of the mass spectrometer in order to be mass analysed.

Matrix Assisted Laser Desorption Ionisation mass spectrometry imaging ("MALDI-MSI") involves analysing the distribution of biomolecules across the surface of a target (e.g. a tissue embedded in a matrix) by scanning the target with a focused laser beam and recording the ion profile at each irradiated pixel. An image of the mass spectral properties of the target across the surface of the target can then be constructed.

According to a known mass spectrometer comprising a Matrix Assisted Laser Desorption Ionisation ("MALDI") ion source analyte ions generated by the ion source are onwardly transmitted to further stages of the mass spectrometer via a first rod set ion guide which is provided in a first or initial vacuum chamber of the mass spectrometer.

One problem with the known arrangement is that the first rod set ion guide can become contaminated or the rod electrodes comprising the first rod set ion guide may otherwise become dirty or coated with analyte and background material. In particular, ions and neutral particles may impact the outer surface of the electrodes forming the first rod set ion guide over a period of time so that the electrodes forming the first rod set ion guide become coated with insulating material which degrades the performance of the first rod set ion guide and hence negatively impacts the overall performance of the mass spectrometer.

In order to maintain performance of the first rod set ion guide and the overall mass spectrometer it is necessary periodically to remove the first rod set ion guide from the first or initial vacuum chamber of the mass spectrometer in order to clean the first rod set ion guide by removing any surface build up of contaminants on the surface of the electrodes of the first rod set ion guide.

However, the process of removing the first rod set ion guide from the first vacuum chamber of the known mass spectrometer is relatively complex and time consuming. The first rod set ion guide of the known arrangement is not readily removeable from the vacuum chamber of the mass spectrometer in which it is housed. As will be understood by those skilled in the art, the first rod set ion guide and the geometry of the vacuum chamber is such that the first rod set ion guide can not be serviced by non-skilled users. In particular, it requires the services of a skilled service engineer in order to remove the first rod set ion guide from the first vacuum chamber of the mass spectrometer.

Furthermore, the process of removing the first rod set ion guide from the first vacuum chamber of the mass spectrometer for cleaning purposes involves fully venting the mass spectrometer prior to removal of the first rod set ion guide from the first vacuum chamber.

It will be understood by those skilled in the art that the process of establishing a high vacuum (low pressure) in a downstream analyser stage of a mass spectrometer is a time consuming process. Accordingly, the conventional approach to cleaning the first rod set ion guide of a mass spectrometer is both relatively complex in that it requires the services of a skilled engineer as well as being relatively time consuming in that the mass spectrometer will be offline for a period of time whilst the mass spectrometer is initially fully vented. Furthermore, once the first rod set ion guide has been removed, cleaned and reinstalled in the first vacuum chamber of the mass spectrometer it then takes a considerable period of time in order to reestablish a high vacuum (low pressure) in the downstream analyser stage of the mass spectrometer.

In an analagous manner, conventionally if it is desired to remove a sub-atmospheric pressure ion source housed in a vacuum chamber of the mass spectrometer in order to operate a different type of ion source then this similarly involves the complete venting of the instrument. Accordingly, conventionally seeking to change a sub-atmospheric pressure ion source for an atmospheric pressure ion source can be a relatively complex and time consuming process requiring the services of a skilled engineer.

It is desired to provide an improved mass spectrometer.

SUMMARY OF THE INVENTION

According to an aspect there is provided apparatus comprising:

a vacuum chamber;

an isolation valve having a curved, spherical, cylindrical or concave portion; and a first ion guide, wherein at least a portion of the first ion guide extends, in use, within a swept volume of the isolation valve or within the curved, spherical, cylindrical or concave portion of the isolation valve.

The apparatus may, for example, comprise an analytical device, a mass spectrometer or an ion mobility spectrometer.

The curved shape or profile of the isolation valve allows the first ion guide to cooperate with the isolation valve so that an end of the first ion guide sits within a swept volume of the isolation valve. According to various embodiments the isolation valve is rotatable and as the isolation valve is rotated the profile of the isolation valve sweeps out a volume which may be referred to as a "swept volume" as will be understood by those skilled in the art. The positioning of at least a portion of the first ion guide within a swept volume of the isolation valve (or within a curved, spherical, cylindrical or concave portion of the isolation valve) and the curved, spherical, cylindrical or concave nature of the isolation valve enables a compact design to be provided and enables a downstream end of the first ion guide to be located close to the entrance of a downstream second ion guide thereby ensuring high ion transmission efficiency between the two ion guides.

The contours of the isolation valve and the arrangement of electrodes forming the first ion guide (which may be arranged upstream of the isolation valve) and/or the arrangement of electrodes forming a second ion guide (which may be arranged downstream of the isolation valve) may be designed to accommodate the isolation valve in an optimum manner. In particular, the electrodes of the first upstream ion guide may be arranged so that the electrodes of the first ion guide extend within and into the swept volume of the isolation valve so as to minimise the distance between the exit or a downstream end of the first ion guide and the entrance or an upstream end of a second downstream ion guide located downstream of the first ion guide and the isolation valve. In particular, when the isolation valve is positioned in an open position in normal operation then the downstream end of the first ion guide may be arranged so as to abut relatively closely to the entrance of the second downstream ion guide so as to provide high ion transmission efficiency between the two ion guides whilst also allowing the isolation valve to be closed in a mode of operation so as to isolate the downstream second ion guide from the upstream first ion guide.

The curved shape or profile of the isolation valve allows the isolation valve to be positioned in close proximity to a second ion guide which may be arranged downstream of the first ion guide. As a result, the first and second ion guides can be located close to each other or in close proximity to each other. The distance between the exit of the first rod set ion guide and the entrance to the second downstream ion guide can therefore be reduced or minimised enabling ions to be transferred efficiently from the first ion guide to the second ion guide without ion loss.

The isolation valve may be operable to enable a first ion optic assembly to be removed from and/or inserted within a first upstream section of a vacuum chamber at the same time as a second downstream section of the vacuum chamber is maintained at a lower pressure than the first upstream section of the vacuum chamber. The first ion optic assembly may comprise one or more first ion guides. For example, the one or more first ion guides may comprise a multipole rod set arrangement comprising a plurality of rod electrodes or a ring set arrangement of electrodes. The first ion optic assembly may comprise a plurality of electrodes, wherein one or more of the electrodes extend within a swept volume of the isolation valve. The isolation valve may have or present a substantially concave profile relative to the first ion optic assembly. The apparatus may further comprise a second ion optic assembly arranged downstream of the isolation valve. The isolation valve may have or present a substantially convex profile relative to the second ion optic assembly. The isolation valve may be rotatable or actuable between an open position and a closed position. When the isolation valve is in an open position the first upstream section of a vacuum chamber including the first ion optic assembly may be in fluid communication with the second downstream section of the vacuum chamber. When the isolation valve is in a closed position the first upstream section of the vacuum chamber including the first ion optic assembly is not in fluid communication with the second downstream section of the vacuum chamber thereby enabling the pressure within the first upstream section to be raised to atmospheric or ambient pressure whilst the second downstream section may be maintained at a substantially lower pressure.

According to various embodiments a spherical or curved valve or isolation valve is provided which is capable of isolating a small chamber containing a first ion guide from further stages of a mass spectrometer. The provision of the isolation valve allows the instrument vacuum to be maintained whilst venting the source. The isolation valve may be provided in conjunction with an ion guide assembly having one or more guide rails and the ion guide assembly may be retained in position by one or more latching clip releases.

The overall arrangement enables a non-skilled user to perform various functions such as closing the isolation valve in order to maintain the low pressure (high vacuum) in downstream vacuum chambers of the instrument and then remove and optionally clean and/or replace the first ion guide. It will be understood that conventionally such functions are reserved for skilled engineers. An analytical instrument, mass spectrometer or ion mobility spectrometer according to various embodiments therefore has an improved serviceability compared with conventional arrangements and in particular an analytical instrument, mass spectrometer or ion mobility spectrometer according to various embodiments may be serviced by non-skilled users.

The isolation valve enables a source or ion source to be vented without the requirement of venting an analyser which may be provided in a downstream analyser vacuum chamber.

According to various embodiments an isolation valve is provided which allows a vacuum chamber containing or housing a first ion guide assembly to be vented and opened without an analyser needing to be vented or fully vented.

Maintaining the vacuum in the analyser enables the voltages applied to the electrodes inside the analyser to be maintained during cleaning and maintenance of the first ion guide or first ion guide assembly with the result that it is not necessary to recalibrate the instrument upon return to operation.

The first ion guide may comprise a plurality of rod electrodes.

The first ion guide may comprise a multipole rod set. For example, according to various embodiments the first ion guide may comprise a quadrupole rod set ion guide, a hexapole rod set ion guide or an octopole rod set ion guide. The first ion guide may comprise more than eight rod electrodes.

One or more RF or AC voltages may be applied to the rod electrodes in order to generate a pseudo-potential ion confinement region within a volume defined by the inscribed radius of the rod set electrodes.

The rod electrodes once removed from the vacuum chamber may be easily cleaned and reinserted into the instrument by a non-skilled user.

At least some of the rod electrodes may have a bevelled, curved or non-planar portion or end which is located, in use, adjacent the isolation valve.

The curved shape or profile of the isolation valve and the bevelled, curved or non-planar portion or end of the first rod set ion guide enables the first ion guide to be positioned in close proximity to the isolation valve and in particular in close proximity with a curved, spherical, cylindrical or concave portion of the isolation valve.

The first ion guide may comprise a plurality of electrodes having an upstream end and a downstream end, wherein a portion or a downstream end of at least some or all of the electrodes is bevelled, curved or non-planar.

The bevelled, curved or non-planar portion or end(s) of the first ion guide enables the ion guide to cooperate with the isolation valve so that the end of the first ion guide sits within a swept volume of the isolation valve. As a result, a compact design is provided which enables the first ion guide to be located close to the entrance of a downstream second ion guide thereby ensuring a high ion transmission efficiency between the two ion guides.

The first ion guide may comprise a ring set ion guide or a plurality of electrodes having apertures through which ions are transmitted in use. The electrodes forming the first ion guide may have an external diameter or profile and the external diameter or profile of one or more electrodes forming the first ion guide may reduce or taper towards a downstream section of the first ion guide.

The ring electrodes may have an internal diameter or first profile and an external diameter or second profile. The external diameter or second profile of one or more electrodes forming the first ion guide may reduce or taper towards a downstream section of the first ion guide so that the first ion guide extends, in use, within a swept volume or a curved, spherical, cylindrical or concave portion of the isolation valve. As a result, the first ion guide can be located close to the entrance of a downstream second ion guide thereby ensuring a high ion transmission efficiency between the two ion guides.

A downstream end of the first ion guide may be located, in use, 10 mm from the isolation valve.

According to various embodiments the first ion guide may be located particularly close to the isolation valve or a curved, spherical, cylindrical or concave portion of the isolation valve in order to improve ion transmission efficiency. For example, according to various embodiments a downstream end of the first ion guide may be located ≤9 mm, ≤8 mm, ≤7 mm, ≤6 mm, ≤5 mm, ≤4 mm, ≤3 mm, ≤2 mm or ≤1 mm from the isolation valve or a portion of the isolation valve.

The apparatus may further comprise a second ion guide, wherein in a mode of operation at least a portion of the isolation valve extends within a portion of the second ion guide.

The second ion guide may be located downstream of the isolation valve and/or downstream of the first ion guide. According to various embodiments ions may be efficiently transmitted from the first ion guide to the second ion guide with essentially negligible loss of ions due to the close packed arrangement between the first ion guide, the isolation valve and the second ion guide.

The second ion guide may comprise a ring set ion guide or a plurality of electrodes having apertures through which ions are transmitted in use.

The second ion guide may comprise a plurality of ring electrodes wherein one or more RF or AC voltages may be applied to the ring electrodes in order to generate a pseudo-potential ion confinement region within the ring set or within the apertures of the electrodes.

According to various embodiments the second ion guide may comprise a StepWave® ion guide arrangement comprising a stacked ring ion guide which is arranged to maximise ion transmission from a source to a mass analyser. The device also allows for the active removal of neutral contaminants, providing an enhancement to overall signal to noise. The second ion guide may facilitate the efficient capture of a relatively diffuse ion cloud entering the first stage, which is then focused into an upper ion guide for transfer to the mass analyser.

The first ion guide may be located, in use, in the vacuum chamber and the isolation valve may be operable to isolate a region downstream of the first ion guide.

For example, the isolation valve may be operable to isolate a portion of a vacuum chamber or a vacuum chamber housing the first rod set ion guide from a second downstream ion guide. The second downstream ion guide may be provided in the same vacuum chamber as the first ion guide or alternatively the second downstream ion guide may be provided in a second or different vacuum chamber.

The isolation valve can be operated by a non-skilled user and enables e.g. a mass analyser to be maintained at a low pressure whilst the first ion guide is removed for servicing.

The apparatus may further comprise an analytical device, a mass analyser or an ion mobility spectrometer arranged downstream of the isolation valve, wherein the isolation valve may be operated so as to maintain the analytical device, mass analyser or ion mobility spectrometer at a sub-atmospheric pressure whilst the first ion guide is removed.

The analytical device, mass analyser or ion mobility spectrometer may be provided in a vacuum chamber which may be maintained, in use, at a relatively low pressure. For example, according to various embodiments the vacuum chamber housing the analytical device or mass analyser may be maintained at a pressure $\leq 10^{-3}$ mbar whilst the first rod set ion guide is removed. According to other embodiments the vacuum chamber housing the analytical device or mass analyser may be maintained at a pressure $\leq 10^{-4}$ mbar, $\leq 10^{-5}$ mbar, $\leq 10^{-6}$ mbar, $\leq 10^{-7}$ mbar or $\leq 10^{-8}$ mbar whilst the first rod set ion guide is removed. It will be understood that maintaining the analytical device or mass analyser at sub-atmospheric pressure whilst the first rod set ion guide is removed (at atmospheric or ambient pressure) and serviced reduces the downtime of the instrument and removes any need to recalibrate the instrument.

The isolation valve may be rotatable between an open position and a closed position.

The curved shape or profile of the isolation valve enables the isolation valve to be rotated from an open position to a closed position in a compact manner enabling close positioning of the first and second ion guides.

According to an aspect there is provided a method comprising:

guiding ions through a first ion guide, wherein at least a portion of the first ion guide extends, in use, within a swept volume of an isolation valve or within a curved, spherical, cylindrical or concave portion of an isolation valve.

The method may further comprise operating the isolation valve so as to maintain an analytical device, a mass analyser or an ion mobility spectrometer at a sub-atmospheric pressure whilst the first ion guide is removed.

The method may further comprise rotating the isolation valve between an open position and a closed position.

According to another aspect there is provided apparatus comprising:

a vacuum chamber;

a housing located within the vacuum chamber and having a guide mechanism; and a first ion optic assembly which is slidable or translatable in cooperation with the guide mechanism thereby enabling the first ion optic assembly to be inserted and aligned within the vacuum chamber.

A MALDI mass spectrometer is known having an ion guide assembly located within a vacuum chamber. However, the ion guide assembly of the known arrangement is not readily removeable and requires tools in order to unfasten and remove the ion guide assembly from the vacuum chamber. As will be understood by those skilled in the art, removing the ion guide assembly of the known mass spectrometer requires the services of a skilled engineer. Removing an ion guide assembly from the vacuum chamber of a conventional mass spectrometer also requires that the MALDI ion source is retracted from the vacuum chamber so that the ion guide assembly can then be manipulated out through a lid in the housing of the vacuum chamber. This is problematic for a number of reasons.

Firstly, during its manipulation, extraction and replacement, a mirror inside the vacuum chamber which provides a viewing window for a MALDI camera can be caught and displaced from its critical alignment.

Secondly, the voltages that are provided to the electrodes that comprise the known ion guide assembly are delivered using wires and connectors that are part of the ion guide assembly. During its manipulation, the wires can become caught or dislodged resulting in a risk of close proximity or contact with other electrodes or components consequently causing an increased risk of electrical breakdown once returned to an operational state.

In contrast to the known arrangement, according to various embodiments a housing is provided within a vacuum chamber and the housing may include guided bearings which ensure that a first ion optic assembly, ion guide or ion transmission device can be removed and/or (re-)inserted without the risk of moving or damaging any of the parts inside the chamber or vacuum chamber.

According to various embodiments a guide rail and associated guide bearings may be provided which allow one or more laser mirrors to be positioned close to the ion optic axis of the ion guide thereby enabling a laser beam to be delivered to a sample at an angle close to normal incidence whilst also reducing the overall working distance between the focusing lens and the sample plate. This has a number of benfits.

Firstly, the reduced angle of incidence reduces the degree of distortion of the incident beam resulting in a more circular illumination of the sample.

Secondly, the ability to include a shorter focal length lens means that the incident laser beam can be more tightly focused on to the sample plate, enabling increased spatial resolution of the locality of the detected ions.

When loading or unloading a sample on a conventional MALDI ion source, a sample plate carrier must travel to a load lock location before sealing against a door. The load lock chamber is then vented. By isolating the analyser vacuum using an isolation valve according to various embodiments and venting the entire chamber there is no requirement for the sample plate carrier to be moved. This reduces the time it takes to unload a sample.

Another problem with the conventional load lock system is the risk that, during loading, a difference between the pressure that is achieved in the load lock chamber and the sample chamber can result in sudden gas flow from the load lock into the sample chamber as the sample carrier retracts from the load lock seal. On occasions, this can result in sample plates falling from the carrier into the main sample vacuum chamber during this transition, resulting in a need to dismantal the whole of the sample chamber in order to retrieve the sample.

In contrast to the known arrangement, the sample chamber according to various embodiments may be fully opened allowing any sample that falls off the carrier to be retrieved easily.

Another benefit of the removal of a load lock is that larger sample plates can be used whilst maintaining a similar length of leadscrew.

Conventionally, changeover from one ion source to another currently requires the complete venting of the instrument. The combination of the isolation valve and the guide bearings and/or a rail configuration according to various embodiments allows the first ion guide assembly to be removed and replaced with an assembly suitable for alternative ion sources without the need to vent the entire instrument.

According to various embodiments an ion guide may be mounted to an assembly which may comprise a guided mounting mechanism. The combination of a vacuum isolation valve and a guided mounting mechanism for an ion guide (which may also have an integrated latch and seal mechanism) enables rapid exchange of an initial or first ion guide and reduces the downtime of a mass spectrometer or other analytical instrument being taken offline for servicing.

The cooperation between the first ion optic assembly and the guide mechanism allows the first ion optic assembly to be removed from the vacuum chamber without becoming tangled or caught with wires or electrical cables. Furthermore, the first ion optic assembly can be inserted and/or removed from the vacuum chamber without any risk of damaging other components including sensitive ion optical components, laser mirrors and the like.

The apparatus according to various embodiments enables the first ion guide of an analytical instrument, mass spectrometer or ion mobility spectrometer to be removed easily for cleaning. After cleaning, the ion guide can be replaced easily by a non-skilled user i.e. a specialist service engineer is not required. In particular, mounting the first ion guide as part of an ion optic assembly and being able to axially slide or translate the first ion guide and associated ion optic assembly into and out of a first (or subsequent) vacuum chamber optionally in the direction of the ion optic axis (i.e. axially) enables a non-skilled user to insert and/or remove a first ion guide without specialist skill. The first ion optic assembly may be provided with a guide mechanism such as one or more guide rails. The guide rails may slide into or engage with one or more guide bearings optionally mounted on a second assembly or a housing which may be arranged to connect with or interlock with the first assembly which may house or include the first ion guide.

The guide rail mechanism according to various embodiments is particularly effective at ensuring and facilitating easy alignment of the first ion guide with the rest of the housing of the analytical instrument, mass spectrometer or ion mobility spectrometer and in ensuring correct and precise positioning of the first ion guide within the first vacuum chamber of an analytical instrument such as a mass spectrometer or ion mobility spectrometer.

Embodiments are contemplated wherein the guide mechanism may comprise a different form of sliding mechanism or wherein the tracks or guides may have different profiles at different axial positions.

Although various embodiments are disclosed wherein the assembly housing the first ion guide comprises one, two or more than two guide rails which slide within or engage with one, two or more than two guide bearings mounted to a second assembly or housing, other embodiments are contemplated wherein the first ion guide assembly may comprise one, two or more than two guide bearings and the second assembly or housing may comprise one, two or more than two guide rails.

The guide mechanism may enable the first ion optic assembly to slide or translate in an axial direction thereby enabling the first ion optic assembly to be removed from and/or inserted within a chamber or vacuum chamber of an analytical instrument such as a mass spectrometer or ion mobility spectrometer.

The first ion optic assembly may further comprise a sealing member having an ion inlet orifice therewithin, wherein the sealing member is arranged to seal against a front portion of the vacuum chamber.

The sealing member may form a vacuum tight seal with the front portion of the chamber or vacuum chamber with the exception of the ion inlet orifice provided in the sealing member. Optionally, the sealing member may include one or more O-ring seals for sealing against the front portion of the vacuum chamber. However, the provision of one or more O-rings is not essential. Accordingly, the sealing member of the first ion optic assembly may seal against the front portion of the chamber or vacuum chamber and pressure may effectively only be equalised via the ion inlet orifice.

The apparatus may further comprise a releasable latch for securing the sealing member against the front portion of the vacuum chamber and/or for securing the first ion optic assembly within the vacuum chamber.

The releasable latch enables the first ion optic assembly to be secured to a front face of a chamber or a vacuum chamber in a manner which enables a non-skilled user to remove or withdraw the first ion optic assembly from the vacuum chamber without the use of tools.

The first ion optic assembly may further comprise a first electrical connector and the housing may further comprise a second electrical connector, wherein in use insertion of the first ion optic assembly into the vacuum chamber causes the first electrical connector to connect with the second electrical connector.

According to various embodiments contact pins and plates may be used to provide electrical connections to the ion guide or first ion guide. The use of contact pins and plates according to various embodiments removes any risk of wires moving or becoming tangled. Furthermore, the guide rail mechanism prevents accidental clashes with any critically aligned components inside the chamber or vacuum chamber such as laser mirrors.

One problem with the known MALDI mass spectrometer is that conventionally the first ion guide located within a vacuum chamber has a series of relatively complex electrical connections which need to be disconnected and then reconnected before the first ion guide can be removed and service. The disconnection and reconnection of the electrical supplies to the first ion guide of the known MALDI mass spectrometer requires the services of a skilled engineer.

However, in contrast to the known arrangement according to various embodiments electrical connections to the ion guide or first ion guide may be made via spring contacts inside the chamber or vacuum chamber. Accordingly, the ion guide or first ion guide can be disconnected and/or reconnected to an electrical supply in a simple manner which does not require the services of a skilled engineer.

A small roughing pump may be connected to a pumping port in the vacuum chamber enabling the pressure in the vacuum chamber to be reduced to a level sufficient to open the isolation valve once the source or ion source and the first ion guide are in position.

In contrast to the known arrangement, the electrical connections to the first ion guide may be disconnected from (and reconnected to) its electrical power supply in a safe manner without requiring the services of a skilled engineer. Furthermore, the electrical connections are kept away from an upstream end of the first ion guide thereby improving both the safety and serviceability of the analytical instrument, mass spectrometer or ion mobility spectrometer and improving the process of removing, cleaning and reinserting the first ion guide from and into the chamber or first vacuum chamber.

According to various embodiments contact pins and plates may be used to provide electrical connections to the ion guide or first ion guide. The use of contact pins and plates according to various embodiments removes any risk of wires moving and enables a first ion guide to be electrically connected and/or disconnected to an associated power supply without requiring a specialist service engineer. The connectors may be positioned so as to connect with a rear (downstream) portion of the first ion guide thereby keeping the connection to an associated power supply away from a user. Accordingly, the design enables electical contact to be made to and broken with the ion guide in a safe manner without requiring specialist skill.

The first ion optic assembly may comprise one or more guide mechanisms, one or more guide rails or one or more guide bearings arranged to receive one or more guide rails. The apparatus may further comprise a second assembly which is arranged to connect with, secure to or interlock with the first ion optic assembly. The second assembly may be arranged and adapted to facilitate alignment of the first ion optic assembly when the first ion optic assembly is inserted into the vacuum chamber. The second assembly may comprise one or more guide mechanisms, one or more guide rails or one or more guide bearings arranged to receive one or more guide rails. The first ion optic assembly may comprise one or more first electrical contacts which in use engage with one or more second electrical contacts provided on the second assembly. The one or more first electrical contacts may be retractable and/or the one or more second electrical contacts may be retractable. The guide mechanism may be arranged so as to enable the ion optic assembly to slide or translate in an axial direction which is substantially parallel to an ion optic axis.

The first ion optic assembly and/or a portion of the vacuum chamber may comprise a spring release mechanism allowing the first ion optic assembly to be releasably secured to a portion of the vacuum chamber. The first ion optic assembly may further comprise one or more extraction electrodes having one or more apertures through which ions are transmitted in use. According to various embodiments either: (i) the one or more apertures may be sized so as not to form a differential pumping aperture; or (ii) the one or more apertures may be sized so as to form a differential pumping aperture.

The first ion optic assembly may form a seal with a front face of the vacuum chamber or a front face of a mass spectrometer.

The first ion optic assembly may comprise a consumable component which is replaced when contaminated.

According to another aspect there is provided a method comprising:

sliding or translating a first ion optic assembly in cooperation with a guide mechanism of a housing located within a vacuum chamber thereby enabling the first ion optic assembly to be inserted and aligned within the vacuum chamber.

According to an aspect there is provided apparatus comprising:

a vacuum chamber having an ion inlet orifice; and an assembly housing a first sub-atmospheric pressure ion source, wherein in a first mode of operation the assembly may be secured to the vacuum chamber so as to align the first ion source with the ion inlet orifice and wherein in a second mode of operation the assembly may be detached thereby enabling a second different ion source to be located adjacent the ion inlet orifice.

Conventionally, changeover from one ion source to another may be a relatively a difficult process. According to various embodiments the apparatus comprises an assembly housing a first sub-atmospheric pressure ion source. In a first mode of operation the assembly may be secured to the vacuum chamber so as to align the first ion source with the ion inlet orifice and in a second mode of operation the assembly may be detached thereby enabling a second different ion source to be located adjacent the ion inlet orifice. As a result, a non-skilled user may operate a sub-atmospheric pressure ion source located within a housing of an assembly and then simply detach the assembly in order to use a different ion source. For example, the second ion source may comprise an atmospheric pressure ion source.

According to various embodiments the assembly or door assembly which was used in a first mode of operation may be re-used to provide a support for a second different ion source. However, whereas in the first mode of operation the assembly or door assembly may have made a vacuum tight seal against a front face of the vacuum chamber or a vacuum chamber, in the second mode of operation the assembly or door assembly may be used simply as a support for the second ion source i.e. in the second mode of operation the assembly or door assembly may not make a tight seal against the front face of the vacuum chamber or a vacuum chamber.

Conventionally, changeover from one ion source to another requires the complete venting of the instrument. According to various embodiments the combination of an isolation valve and guide bearings and/or a rail configuration allows a first ion guide assembly to be removed and replaced with an assembly suitable for alternative ion sources without the need to vent the entire instrument.

The assembly may comprise a door assembly.

The apparatus may comprise an ion source housing which forms a seal with the front face of a vacuum chamber or a front face of the mass spectrometer.

The apparatus may further comprise a sub-atmospheric pressure ion source provided or located within the ion source housing.

The ion source housing may comprise a removable door assembly.

The apparatus may further comprise an atmospheric pressure ion source which may be used in a second mode of operation.

According to various embodiments a sub-atmospheric pressure ion source, such as a Matrix Assisted Laser Desorption Ionisation ("MALDI") ion source, may be provided in the door assembly which may be secured to the vacuum chamber. The assembly or door assembly can be easily detached from the vacuum chamber enabling a different type of ion source to be used.

The assembly may comprise a translation stage.

According to various embodiments the assembly may comprise an x-y translation stage for translating a sample plate such as a MALDI sample plate in one or more orthogonal directions. In particular, a laser beam may be arranged to emerge from the apparatus via the ion inlet orifice. One or more sample regions to be ionised by the laser beam may be translated into position using the translation stage.

In the first mode of operation the translation stage may be translated in a first direction perpendicular to a direction of ion transmission through the ion inlet orifice and/or in a second direction perpendicular to a direction of ion transmission through the ion inlet orifice, wherein the first direction is perpendicular to the second direction.

According to various embodiments the assembly and translation stage may in the first mode of operation be arranged so as to translate e.g. a sample plate in an x-direction and/or a y-direction wherein the x-direction and/or the y-direction are also orthogonal to an ion-optical axis or z-direction which may pass through the ion inlet orifice.

The first ion source may comprise a Matrix Assisted Laser Desorption Ionisation ("MALDI") ion source.

The source or ion source may comprise a MALDI ion source although it should be understood that the present invention is not limited to the use of a MALDI ion source. If a MALDI ion source is provided then the sample chamber may be enclosed and operated under vacuum. According to various embodiments a MALDI ion source may be provided within an enclosure or housing which may form part of the assembly or door assembly which may engage with or secure to the front end of the mass spectrometer (or other analytical instrument) or the front end of a vacuum chamber or the first vacuum chamber. A small pump may be included to rough pump the sample chamber or housing prior to opening an isolation valve and exposing the source or ion source to the instrument vacuum.

MALDI acquisions generate a plume of material when a laser fires at a target. Some of the plume of material is ionised and is onwardly transmitted into the analyser whilst neutral species spread within the first vacuum chamber and are deposited on the localised surfaces. Over time, and use, this deposit on the surface of the electrodes can affect the electric fields generated by the electrodes and be detrimental to the sensitivity of the instrument. As a result, the first ion guide assembly requires cleaning periodically.

Conventional MALDI ion sources coupled to a mass spectrometer require that the instrument is fully vented in order to remove a first ion guide. In contrast, an instrument according to various embodiments does not need to be fully vented prior to removing a first ion guide.

In the second mode of operation the assembly may be attached to the vacuum chamber or another part of the apparatus.

According to various embodiments the assembly or door assembly which was used in a first mode of operation may be re-used to provide a support for a second different ion source. However, whereas in the first mode of operation the assembly or door assembly may have made a vacuum tight seal against a front face of the vacuum chamber or a vacuum chamber, in the second mode of operation the assembly or door assembly may be used simply as a support for the second ion source i.e. in the second mode of operation the assembly or door assembly may not make a tight seal against the front face of the vacuum chamber or a vacuum chamber.

In the second mode of operation the assembly may include a translation stage, wherein the translation stage may be translated in a first direction parallel to a direction of ion transmission through the ion inlet orifice and/or in a second direction perpendicular to a direction of ion transmission through the ion inlet orifice.

According to various embodiments the assembly and translation stage may in the second mode of operation be arranged so as to translate e.g. a sample plate in an x-direction (or a y-direction) and/or in a z-direction which may pass through the ion inlet orifice and which is parallel to an ion-optical axis.

The second ion source comprises at atmospheric pressure ion source.

For example, the second ion source may comprises a Desorption Electrospray Ionisation ("DESI") ion source, a Low Temperature Plasma ("LTP") ion source, a Direct Analysis in Real Time ("DART") ion source or an Inductively Coupled Plasma ("ICP") ion source.

According to another aspect there is provided a method comprising:

securing an assembly housing a first sub-atmospheric pressure ion source to a vacuum chamber having an ion inlet orifice so as to align the first ion source with the ion inlet orifice; and then detaching the assembly and locating a second different ion source adjacent the ion inlet orifice.

The assembly may comprise a translation stage and the method may further comprise translating the translation stage in a first direction perpendicular to a direction of ion transmission through the ion inlet orifice and/or in a second direction perpendicular to a direction of ion transmission through the ion inlet orifice, wherein the first direction is perpendicular to the second direction.

The method may further comprise attaching the assembly to the vacuum chamber.

The assembly may include a translation stage and the method may further comprise translating the translation stage in a first direction parallel to a direction of ion transmission through the ion inlet orifice and/or in a second direction perpendicular to a direction of ion transmission through the ion inlet orifice.

According to an aspect there is provided apparatus comprising:

a vacuum chamber having an ion inlet orifice; and an assembly housing a first sub-atmospheric pressure ion source, wherein in a first mode of operation the assembly may be secured to the vacuum chamber so as to align the first ion source with the ion inlet orifice and wherein in a second mode of operation the assembly may be detached thereby enabling a second different ion source to be located adjacent the ion inlet orifice.

Conventionally, attempting to change a sub-atmospheric pressure ion source to a different ion source is a relatively a difficult process. In contrast, according to various embodiments a sub-atmospheric pressure ion source may be easily swapped for a different ion source.

According to various embodiments the apparatus comprises an assembly housing a first sub-atmospheric pressure ion source. In a first mode of operation the assembly housing the sub-atmospheric pressure ion source may be secured to a vacuum chamber of a mass spectrometer so as to align the first sub-atmospheric pressure ion source with the ion inlet orifice. Then when it is desired to operate a different ion source, in a second mode of operation the assembly may be detached thereby enabling a second different ion source to be located adjacent the ion inlet orifice. As a result, a non-skilled user may operate a sub-atmospheric pressure ion source located within a housing of an assembly and then simply detach the assembly in order to use a different ion source. For example, the sub-atmospheric pressure ion source may be swapped for a second atmospheric pressure or ambient ion source.

According to various embodiments the assembly or door assembly which housed or houses the first sub-atmospheric pressure ion source in a first mode of operation may be re-used in order to provide a support or platform for a second different ion source. For example, the assembly or door assembly may be arranged to be secured or securable to a surface of the instrument in order to provide a support or platform for the second ion source. According to various embodiments the assembly or door assembly may be removably securable to the front face of a vacuum chamber of a mass spectrometer enabling an atmospheric pressure ion source to be positioned close to an ion inlet orifice provided in a face of the vacuum chamber.

In the first mode of operation the assembly or door assembly may make a vacuum tight seal against a front face of the vacuum chamber or a vacuum chamber. However, it will be understood that in the second mode of operation the assembly or door assembly may be used simply as a support or platform for the second ion source. Accordingly, in the second mode of operation the assembly or door assembly may not make a tight seal against the front face of the vacuum chamber or a vacuum chamber.

Conventionally, changeover from a sub-atmospheric pressure ion source to another ion source requires the complete venting of the instrument. According to various embodiments the combination of an isolation valve and an easily removable initial ion guide enables the initial stage of a mass spectrometer to be isolated thereby allowing the assembly or door assembly housing a sub-atmospheric pressure ion guide to be pressurised and then opened or detached. The initial ion guide may be housed in a housing having bearings and/or a rail configuration which allows the first ion guide assembly to be removed and replaced with a different ion guide assembly which may be optimised for the second or alternative ion source. In particular, the ion source can be changed and the initial ion guide assembly can also be changed or optimised without needing to vent the entire instrument.

The assembly may comprise a door assembly.

The apparatus may comprise an ion source housing which forms a seal with the front face of a vacuum chamber or a front face of the mass spectrometer. The apparatus may further comprise a sub-atmospheric pressure ion source provided or located within the ion source housing. The ion source housing may comprise a removable door assembly.

According to various embodiments a sub-atmospheric pressure ion source, such as a Matrix Assisted Laser Desorption Ionisation ("MALDI") ion source, may be provided in the assembly or door assembly which may be secured to the vacuum chamber. The assembly or door assembly can be easily detached from the vacuum chamber enabling a different type of ion source to be used.

The assembly may comprise a translation stage.

According to various embodiments the assembly may comprise an x-y translation stage for translating a sample plate such as a MALDI sample plate in one or more orthogonal directions. In particular, a laser beam or laser pulses may be arranged to emerge from the apparatus via the ion inlet orifice provided, for example, in a front face of the vacuum chamber. A sample region or a particular sample to be ionised by the laser beam or laser pulses may be translated into position using the translation stage. The sample may be translated by the translation stage and different regions or portions of the sample or different samples may be ionised by the laser beam or laser pulses. According to various embodiments the laser beam or laser pulses may be provided in a fixed location or position and a sample may be translated across the laser beam or laser pulses.

In the first mode of operation the translation stage may be translated in a first direction perpendicular to a direction of ion transmission through the ion inlet orifice and/or in a second direction which is also perpendicular to a direction of ion transmission through the ion inlet orifice, wherein the first direction is perpendicular to the second direction.

According to various embodiments the assembly and translation stage may in the first mode of operation be arranged so as to translate e.g. a sample plate in an x-direction and/or a y-direction wherein the x-direction and/or the y-direction are also orthogonal to an ion-optical axis or z-direction which may pass through the ion inlet orifice.

The first sub-atmospheric pressure ion source may comprise a Matrix Assisted Laser Desorption Ionisation ("MALDI") ion source.

The source or ion source may comprise a MALDI ion source although it should be understood that the present invention is not limited to the use of a MALDI ion source as the first sub-atmospheric pressure ion source. If a MALDI ion source is provided then the sample chamber housing the sample and the MALDI ion source may be enclosed and operated under vacuum. According to various embodiments a MALDI ion source may be provided within an enclosure or housing which may form part of the assembly or door assembly which may engage with or secure to the front end of the mass spectrometer (or other analytical instrument) or the front end of a vacuum chamber or the first vacuum chamber. A small pump may be included to rough pump the sample chamber or housing prior to opening an isolation valve and exposing the source or ion source to the instrument vacuum.

MALDI acquisions generate a plume of material when a laser fires at a target. Some of the plume of material is ionised and is onwardly transmitted into the analyser whilst neutral species spread within the first vacuum chamber and are deposited on the localised surfaces. Over time, and use, this deposit on the surface of the electrodes can affect the electric fields generated by the electrodes and be detrimental to the sensitivity of the instrument. As a result the first ion guide assembly requires cleaning periodically.

Conventional MALDI ion sources coupled to a mass spectrometer require that the instrument is fully vented in order to remove a first ion guide. In contrast, an instrument according to various embodiments does not need to be fully vented prior to removing a first ion guide.

In the second mode of operation the assembly may be attached to the vacuum chamber or another part of the apparatus. According to various embodiments the assembly or door assembly which was used in a first mode of operation may be re-used to provide a support or platform for a second different ion source. However, whereas in the first mode of operation the assembly or door assembly may have made a vacuum tight seal against a front face of the vacuum chamber or a vacuum chamber, in the second mode of operation the assembly or door assembly may be used simply as a support or platform for the second ion source i.e. in the second mode of operation the assembly or door assembly may not make a tight seal against the front face of the vacuum chamber or a vacuum chamber.

In the second mode of operation the assembly may include a translation stage, wherein the translation stage may be translated in a first direction which is parallel to a direction of ion transmission through the ion inlet orifice and/or in a second direction which is perpendicular to a direction of ion transmission through the ion inlet orifice.

According to various embodiments the assembly and translation stage may in the second mode of operation be arranged so as to translate e.g. a sample plate in an x-direction (or a y-direction) and/or also in a z-direction which may pass through the ion inlet orifice and which may be parallel to an ion-optical axis.

The second ion source may comprise at atmospheric pressure ion source. Accordingly, various embodiments are contemplated wherein a first sub-atmospheric pressure ion source may be exchanged for a second atmospheric pressure ion source.

For example, the second ion source may comprise a Desorption Electrospray Ionisation ("DESI") ion source, a Low Temperature Plasma ("LTP") ion source, a Direct Analysis in Real Time ("DART") ion source or an Inductively Coupled Plasma ("ICP") ion source.

According to another aspect there is provided a method comprising:

securing an assembly housing a first sub-atmospheric pressure ion source to a vacuum chamber having an ion inlet orifice so as to align the first ion source with the ion inlet orifice; and then detaching the assembly and locating a second different ion source adjacent the ion inlet orifice.

The assembly may comprise a translation stage and the method may further comprise translating the translation stage in a first direction perpendicular to a direction of ion transmission through the ion inlet orifice and/or in a second direction perpendicular to a direction of ion transmission through the ion inlet orifice, wherein the first direction is perpendicular to the second direction.

The method may further comprise attaching the assembly to the vacuum chamber.

The assembly may include a translation stage and the method may further comprise translating the translation stage in a first direction parallel to a direction of ion transmission through the ion inlet orifice and/or in a second direction perpendicular to a direction of ion transmission through the ion inlet orifice.

According to an aspect there is provided an analytical instrument, mass spectrometer or ion mobility spectrometer comprising apparatus as described above.

According to an aspect there is provided a method of mass spectrometry or ion mobility spectrometry comprising a method as described above.

According to an aspect there is provided a method of cleaning or replacing an ion guide comprising a method as described above.

BRIEF DESCRIPTION OF THE DRAWINGS

Various embodiments will now be described, by way of example only, and with reference to the accompanying drawings in which.

DETAILED DESCRIPTION

Figure 1:
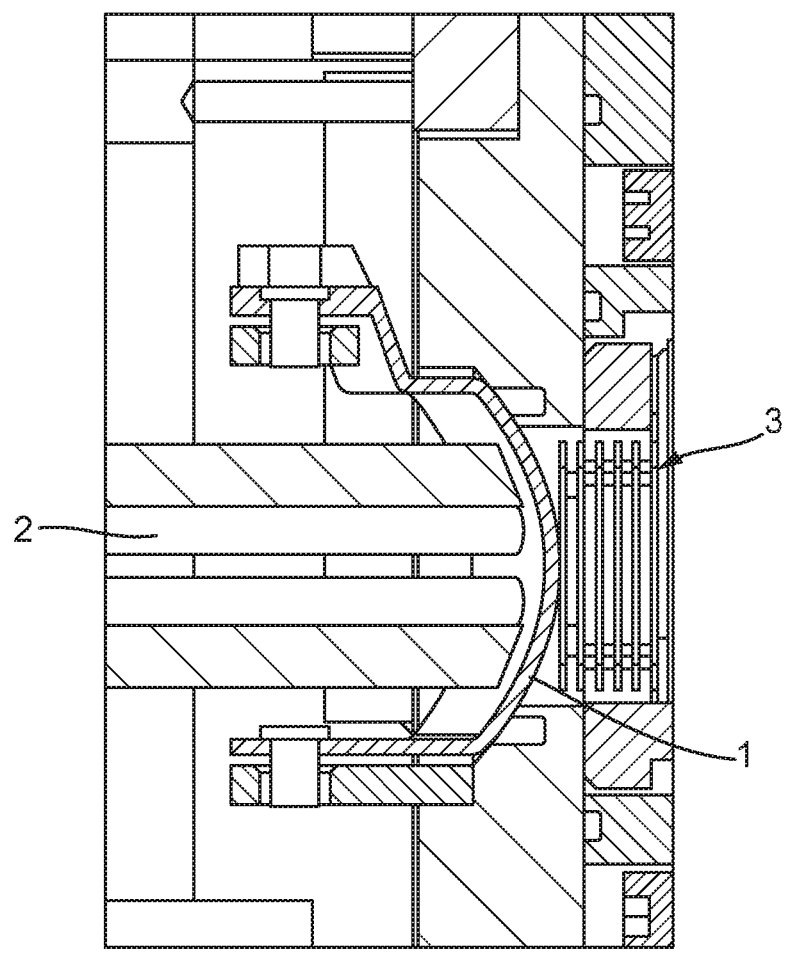
FIG. 1 shows a cross section of an isolation valve in a closed position according to various embodiments, wherein the isolation valve is provided between a first upstream ion guide assembly and a second downstream ion guide assembly.

Various embodiments will now be described in more detail.

According to various embodiments a number of component assemblies are provided which enable a first ion optic assembly provided at the front end or initial stage of an analytical instrument such as a mass spectrometer or ion mobility spectrometer to be removed, cleaned and then replaced and/or reinserted in a simple manner which, for example, can be performed by a non-skilled user and which does not require the services of a skilled engineer.

According to various embodiments a door assembly is also disclosed which enables one ion source to be swapped for another ion source in a simple manner without requiring a user to be skilled.

The mass spectrometer may include an ion source such as, for example, a Matrix Assisted Laser Desorption Ionisation ("MALDI") ion source comprising an enclosed sample chamber which in use is operated under a vacuum or at sub-atmospheric pressure.

According to various embodiments an assembly or door assembly is disclosed which enables a sub-atmospheric pressure ion source to be swapped for another ion source (e.g. an atmospheric pressure ion source) in a simple manner without requiring the services of a skilled engineer.

The mass spectrometer may include an ion source such as, for example, a Matrix Assisted Laser Desorption Ionisation ("MALDI") ion source within an enclosed sample chamber which in use may be operated under a vacuum or at sub-atmospheric pressure.

Ions generated by the ion source may be onwardly transmitted to a first ion guide which optionally may form part of a first ion optic assembly. As will be understood by those skilled in the art, the first ion guide may become contaminated over time with deposits due to ions and/or neutral particles impacting upon the electrodes or rods forming the first ion guide assembly. As a result, the performance of the first ion guide may start to deteriorate and this will have a negative impact upon the overall performance of the analytical instrument, mass spectrometer or ion mobility spectrometer.

Accordingly, in between analysis of samples it may be necessary or desirable periodically to remove the first ion guide and any associated first ion optic assembly for cleaning purposes. However, it will be appreciated that conventionally the process of removing a first ion guide for cleaning purposes will result in the high vacuum (low pressure) in the downstream vacuum chambers being lost. This can result in the mass spectrometer being offline or otherwise being non-operational for a relatively long period of time since the mass spectrometer will first need to be fully vented so that the first ion guide can then be removed and then once the first ion guide has been reinserted the high vacuum (low pressure) in the downstream analyser sections of the mass spectrometer will need to be restored.

In contrast to conventional arrangements according to various embodiments the first ion optic assembly can be removed (for example, easily removed) without needing to fully vent the analyser. As a result, the sections of the mass spectrometer downstream of the first ion guide can be maintained at a relatively high vacuum (low pressure) whilst the ion guide is serviced or replaced.

According to various embodiments an isolation valve is provided which enables the analytical instrument, mass spectrometer or ion mobility spectrometer downstream of the first ion optic assembly to be maintained at a relatively high vacuum (low pressure) when the first ion guide and associated first ion optic assembly are removed e.g. for cleaning or replacement purposes.

FIG. 1 shows a spherical or cylindrical contoured isolation valve 1 which may be provided according to various embodiments. The purpose of the isolation valve 1 is to isolate a downstream section of a chamber or vacuum chamber when a first upstream ion guide 2 is desired to be removed from the chamber or vacuum chamber for cleaning purposes. A first upstream ion guide assembly 2 is shown in FIG. 1. The first upstream ion guide 2 may, for example, comprise a multipole rod set arrangement comprising e.g. a quadrupole, hexapole or octopole ion guide. From time to time it may be desired to remove the first ion guide assembly 2 from the analytical instrument, mass spectrometer or ion mobility spectrometer for cleaning purposes or optionally to replace the first ion guide assembly 2 if necessary (for example if the first ion guide 2 has become worn due to repeated cleaning).

As shown in FIG. 1, the exit side or downstream end of the electrodes which form the first ion guide assembly 2 may have a bevelled, curved or non-planar profile or may otherwise have a contoured profile which allows the first ion guide assembly 2 to extend within a swept volume of the isolation valve 1. The isolation valve 1 may be rotated from a closed position to an open position and the isolation valve 1 may be arranged so that when the isolation valve 1 is in a closed position then the isolation valve 1 has a crosssectional profile which presents a concave portion adjacent the downstream end of the first ion guide 2 and which presents a convex portion adjacent an upstream end of a second downstream ion guide 3.

The isolation valve 1 as shown in FIG. 1 is shown in a closed position. The isolation valve 1 may, for example, be rotatable or according to other embodiments the isolation valve 1 may be otherwise actuated between an open and closed position. In a mode of operation the isolation valve 1 may be rotated into an open position by rotating the isolation valve by e.g. 90° from the closed position as shown in FIG. 1 to an open position wherein the isolation valve is moved so as no longer to block an ion path between the upstream first ion guide assembly 2 and a downstream second ion guide 3.

The isolation valve 1 may have a spherical or curved contour which allows the isolation valve 1 to be positioned within or extend within the inner diameter of one or more first or initial electrode(s) of a second ion guide 3 which may be provided downstream from the first ion guide assembly 2 and the isolation valve 1. The second ion guide 3 may, for example, comprise a stacked ring ion guide 3 as shown in FIG. 1. However, other embodiments are contemplated wherein the second ion guide 3 may comprise a multipole rod set arrangement comprising a plurality of rod electrodes. For example, the second ion guide 3 may comprise a quadrupole, hexapole or octopole arrangement. According to other embodiments the second ion guide 3 may comprise another a stacked plate or sandwich arrangement of planar electrodes arranged generally parallel to a direction of ion travel through the second ion guide 3.

The shape and orientation of the isolation valve 1 enables the isolation valve 1 to be inserted or otherwise positioned between the exit of a first ion guide assembly 2 and the entrance of a second ion guide assembly 3 whilst minimising the distance between the two ion guide assemblies 2,3. As a result, when the isolation valve 1 is in a normal open position ion transmission from the first upstream ion guide 2 to the second downstream ion guide 3 is optimised or unaffected because of the close proximity of the two ion guides 2,3. In particular, since the two ion guides 2,3 can be located close to each other than the ion acceptance angle of the second downstream ion guide 3 may be such substantially that all ions emerging from the exit of the first ion guide 2 are received at an angle falling within the ion acceptance angle of the second ion guide 3.

Figure 2A:
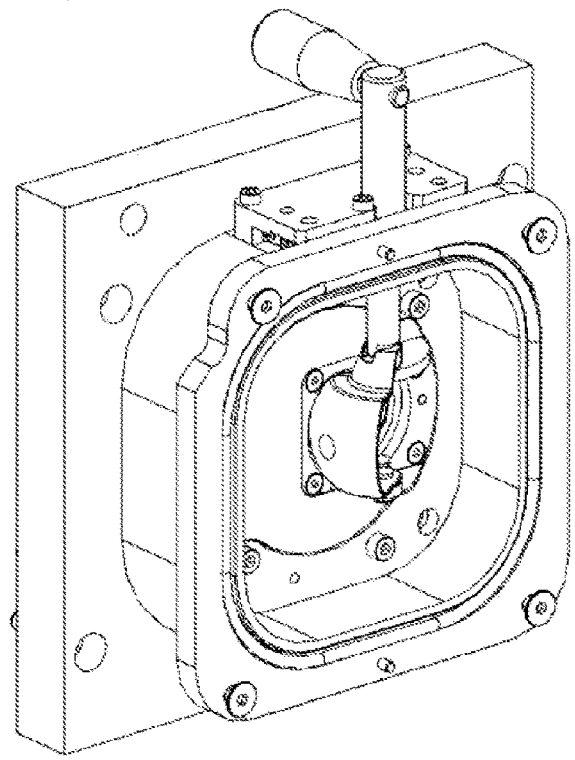
FIG. 2A shows a vacuum isolation valve according to various embodiments rotated to be in an open position and FIG. 2B shows the vacuum isolation valve rotated to be in a closed position.
Figure 2B:
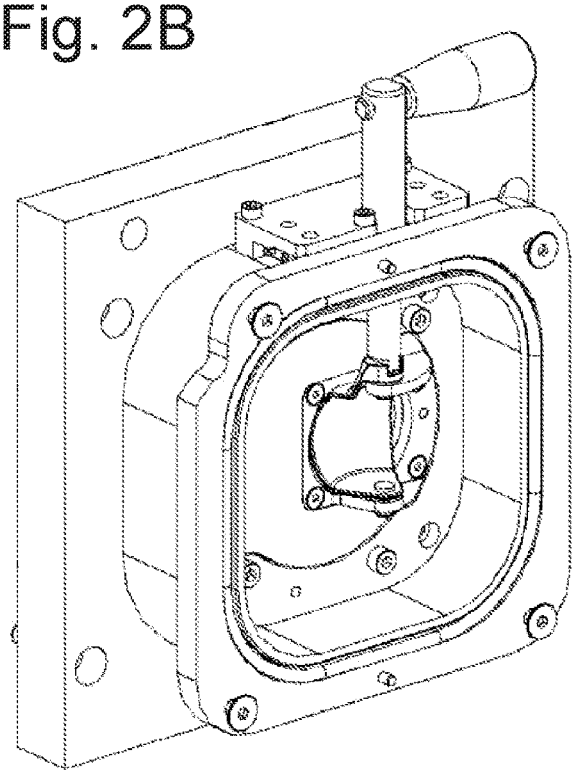

The isolation valve 1 may comprise a spherical or cylindrical section and the isolation valve 1 may be rotated by 90° between an open position (as shown in FIG. 2A) and a closed position (as shown in FIG. 2B). The isolation valve 1 may be rotated, closed or opened either manually or automatically. Embodiments are also contemplated wherein the isolation valve may be positioned in an intermediate position between fully open and fully closed. For example, the isolation valve 1 may be positioned so as to be partially or slightly open/closed allowing the pressure of the vacuum chamber downstream of the isolation valve 1 to be carefully controlled. Altering the status of the isolation valve 1 allows a first or front introduction stage of a vacuum chamber to be isolated from a downstream section of the vacuum chamber and hence from the main vacuum chamber(s) housing the mass analyser of the mass spectrometer.

Embodiments are contemplated wherein the mass analyser housed in a downstream analyser chamber or vacuum chamber may comprise a quadrupole mass analyser, a 2D or linear quadrupole mass analyser, a Paul or 3D quadrupole mass analyser, a Penning trap mass analyser, an ion trap mass analyser, a magnetic sector mass analyser, an Ion Cyclotron Resonance ("ICR") mass analyser, a Fourier Transform Ion Cyclotron Resonance ("FTICR") mass analyser, an electrostatic mass analyser arranged to generate an electrostatic field having a quadro-logarithmic potential distribution, a Fourier Transform electrostatic mass analyser, a Fourier Transform mass analyser, a Time of Flight mass analyser, an orthogonal acceleration Time of Flight mass analyser or a linear acceleration Time of Flight mass analyser.

The isolation valve 1 may be positioned or may be arranged to insert itself or operate between the first ion guide assembly 2 and a second ion guide assembly 3 as shown in FIG. 1 and wherein both the first and second ion guides 2,3 are located within the same vacuum chamber. Accordingly, the isolation valve 1 may not form a differential pumping aperture i.e. in normal operation both the first and second ion guides 2,3 may be intended to be operated at substantially the same pressure. Closing the isolation valve 1 so as to prevent fluid communication between a region upstream of the isolation valve 1 and a region downstream of the isolation valve 1 allows the first stage of the vacuum chamber upstream of the isolation valve 1 to be vented without affecting the vacuum in the main analyser housing and downstream vacuum chamber(s).

As shown in FIG. 1, the ends of the electrodes of the first ion guide assembly 2 may be bevelled, curved or otherwise shaped to better accommodate the contour of a spherical section isolation valve 1. In particular, a compact arrangement can be formed which allows close positioning of the first and second ion guides 2,3.

The first ion guide 2 can be easily removed allowing the first ion guide 2 to be cleaned or replaced. In particular, the first ion guide 2 can be removed by a non-skilled user in a safe manner without risk of electrocution and without risk of damaging sensitive ion-optical components and/or electrical connections.

Figure 3:
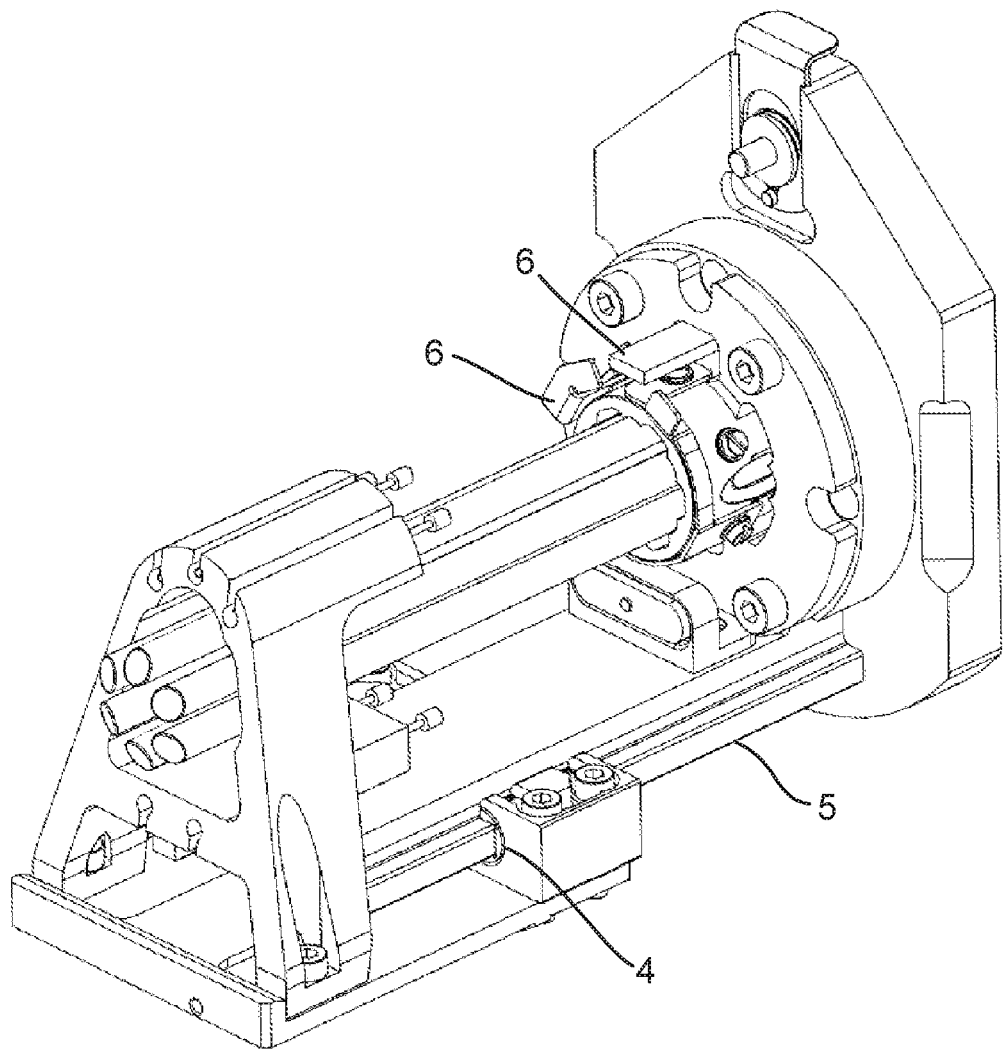
FIG. 3 shows a first ion guide assembly fitted with a guide rail for facilitating axial alignment of a first ion guide and ensuring controlled extraction and insertion of the first ion guide out of and into a first vacuum chamber and wherein contact plates provide a means of electrical connection.

As shown in FIG. 3, the first ion guide 1 may be mounted to or form part of a first ion optic assembly. According to various embodiments the first ion optic assembly may comprise a multipole rod set arrangement mounted at an upstream end within a circular housing or collar. The circular housing or collar may, as shown in FIG. 3, further comprise one or more contact plates 6 which are arranged to connect to corresponding electrical contacts provided in a second assembly or housing which is arranged to engage with and interlock with the first assembly. The first ion optic assembly may be removeable and the second assembly or housing may be fixed.

According to various embodiments the first ion optic assembly or first assembly which may include electrodes forming the first ion guide may be arranged to be removable whilst the second assembly may be arranged to remain in position and not to be removable, at least by a non-skilled user.

The first assembly may include one or more plates or other planar surfaces which may be arranged to slide into a guide provided on the second assembly. The first assembly may, for example, comprise one or more bottom plates which may have guide rails 5 along the outer or side edge of the plate(s). The guide rails 5 may be arranged to be received within and slide within one or more guide bearings 4 which may be attached to or otherwise form part of the second assembly or housing.

Embodiments are also contemplated wherein the first (removable) assembly may comprise one or more guide bearings and the second (fixed) assembly may comprise one or more guide mechanisms or guide rails.

Other embodiments are contemplated wherein the first assembly may comprise one or more guide bearings and/or one or more guide mechanisms or guide rails and the second assembly may comprise one or more guide bearings and/or one or more guide mechanisms or guide rails.

Further embodiments are also contemplated wherein the second assembly may also be removable from the vacuum chamber.

FIG. 3 shows an illustrative embodiment comprising two guide bearings 4 in combination with two guide rails 5 which allows the first ion optic assembly to be drawn out and removed in a direction parallel to the ion optic axis without the risk of accidental contact with any critically positioned components inside the first stage of the vacuum housing.

The axial direction of motion when inserting or removing the first ion optic assembly 2 combined with the contoured end profiles of the first ion guide electrodes 2 and the shape or profile of the isolation valve 1 allows the isolation valve 1 to swing, rotate or otherwise move from an open or fully open position to a closed or fully closed position whilst minimising the distance between the exit of the first ion guide assembly 2 and the entry or entrance region of the second ion guide assembly 3.

Removal or insertion of the ion guide 2 in a lateral direction relative to the ion optical axis (i.e. orthogonal to the longitudinal axis of the first ion guide 2 and the ion optical axis) would require that the electrodes forming the first ion guide 2 are retracted out of the volume enclosed by the isolation valve.

Electrical connections to the first ion guide 2 may be made inside or within a vacuum chamber or a first vacuum chamber of a mass spectrometer or ion mobility spectrometer by means of one or more contact plates 6. The one or more contact plates 6 may form part of the first ion optic assembly 2. The one or more contact plates 6 provided as part of the first ion optic assembly 2 may be arranged so as to engage and provide an electrical contact with one or more contacts 7 which may form part of the second assembly or housing.

Figure 4:
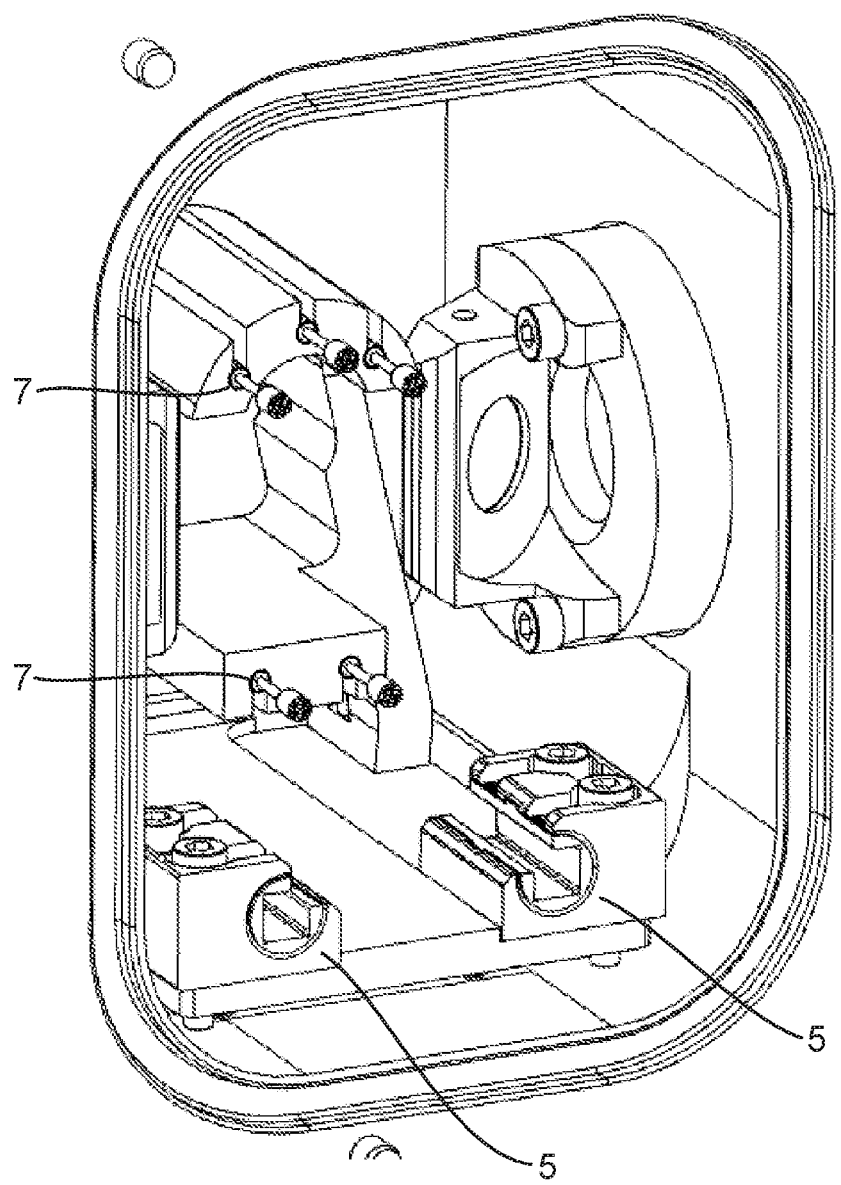
FIG. 4 shows a second assembly or housing which is arranged to receive the first ion guide assembly, wherein the second assembly or housing comprises two guide bearings for receiving corresponding guide rails of the first ion guide assembly and wherein the second assembly or housing is mounted in a first vacuum chamber and has electrical spring contacts for making electrical contact with the first ion guide assembly.

As shown in FIG. 4, the one or more contacts 7 which may form part of the second assembly or housing may comprise electrical spring contacts 7. According to various embodiments the spring electrical contacts 7 may comprise one or more pins or projections which may be notched so as to engage with a contact plate 6 provided as part of the first assembly. One or more of the contact plates 6 provided as part of the first assembly may also have a projection, notch or other engagement mechanism for engaging with a corresponding contact 7 provided in the second assembly or housing. One or more of the spring contacts 7 may, for example, be axially spring loaded so that they may be retractable a short distance axially into the housing of the second assembly.

Embodiments are also contemplated wherein one or more contact plates 6 are provided as part of the second assembly or housing and one or more contacts or spring contacts 7 are provided as part of the first assembly.

Yet further embodiments are contemplated wherein the first assembly may comprise a mixture of contact plates 6 and contact or spring contacts 7 and/or wherein the second assembly or housing may comprise a mixture of contact plates 6 and contact or spring contacts 7.

The contact plates 6 and corresponding spring contacts 7 enable the first ion optic assembly 2 to be removed easily and replaced without the requirement to disconnect or connect a complex series of wires or plugs. In particular, the first ion guide assembly can be electrically disconnected and removed by a non-skilled user without risk of electrocution and without risk of damaging sensitive electrical power supplies or other components located within the vacuum chamber.

The first ion guide assembly may comprise a housing having an upstream or front face which engages with a front end, panel, flange or section of the mass spectrometer of first vacuum chamber. The first ion guide assembly may, for example, be arranged to be positioned in use so that the front face of the first ion guide assembly is essentially flush with the front end, panel, flange or section of the first vacuum chamber or mass spectrometer. The guide rails or other engagement mechanism provided as part of the first assembly may ensure that the first ion guide 2 can only be inserted into the first vacuum chamber of the mass spectrometer in a single desired position or orientation. For example, the guide mechanism may be provided at bottom or top portions of the first assembly in a horizontal plane. Alternatively, the guide mechanism may be provided in a vertical plane on one or both side portions of the first assembly.

The arrangement of the guide assembly may ensure that the first assembly including the first ion guide 2 is only capable of being inserted into the vacuum chamber in a correct orientation. In contrast, with a known arrangement it may be possible inadvertently to remount the first ion guide in a different orientation to that previously with the result that the mass spectrometer may need to be adjusted or recalibrated in order to ensure optimal performance.

According to various embodiments the first ion guide assembly can only be inserted back into the first vacuum chamber or a vacuum chamber of the mass spectrometer in exactly the same orientation as it was previously. Accordingly, no adjustment or recalibration of the mass spectrometer is required once the first ion guide assembly is reinserted.

The first ion guide assembly may be locked, located or otherwise secured in a home position by, for example, a press release mechanism. According to various embodiments the press release mechanism may comprise a spring latch mechanism 8 as shown in FIG. 5. The press release mechanism or spring latch mechanism 8 allows the first assembly including the first ion guide to released or otherwise freed from being secured within the first vacuum chamber or a vacuum chamber of the mass spectrometer. In particular, the ion guide can be removed without requiring any extraction tools and without requiring the services of a specialist engineer. According to various embodiments depressing the latch 8 frees the assembly allowing it to be removed from the vacuum chamber.

It is contemplated, for example, that the first ion guide assembly and the process of removing the first ion guide assembly may be performed by unskilled personnel. For example, the mass spectrometer or other analytical instrument might be operated by a nurse in a surgical environment to analyse biological samples in a clinical setting. It is also contemplated that the first ion guide assembly may comprise a consumable part which when dirty may simply be replaced with a new ion guide assembly. In a military setting, for example, the mass spectrometer may be operated in a field hospital and it may be desired to prolong the useful service life of the mass spectrometer by replacing the first ion guide assembly with a new ion guide assembly. The new ion guide assembly may comprise a cheaper, simpler or less robust component than the ion guide assembly which it replaces, but the purpose of the replacement ion guide assembly may be to extend the service life of the mass spectrometer especially during a period of high demand or in an emergency situation.

Figure 5A:
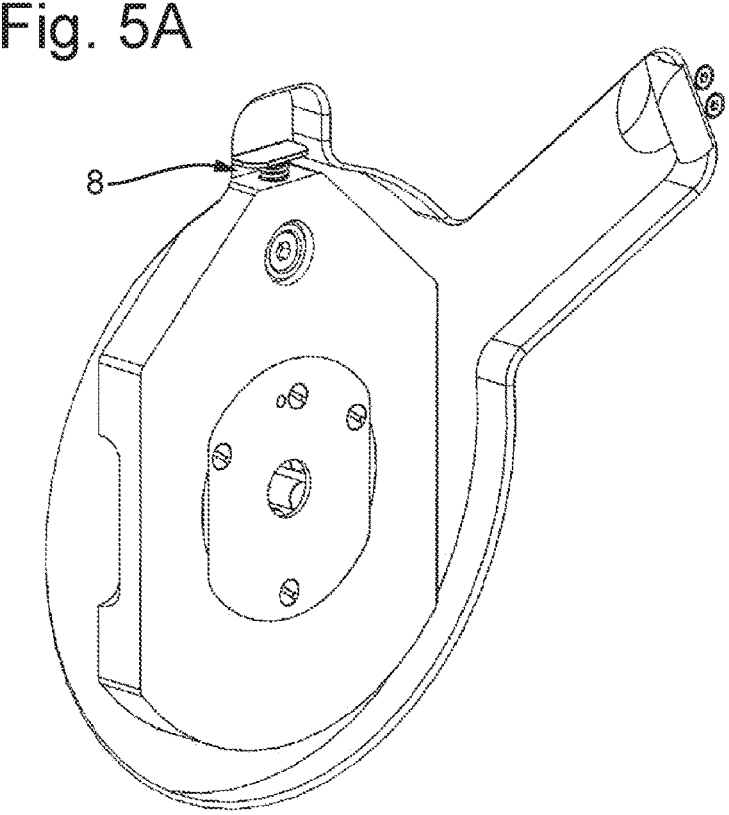
FIG. 5A shows a press release spring latch used to locate the first ion guide in a home position and FIG. 5B shows the press release having been operated to enable the first ion guide assembly to be withdrawn from the first vacuum chamber.
Figure 5B:
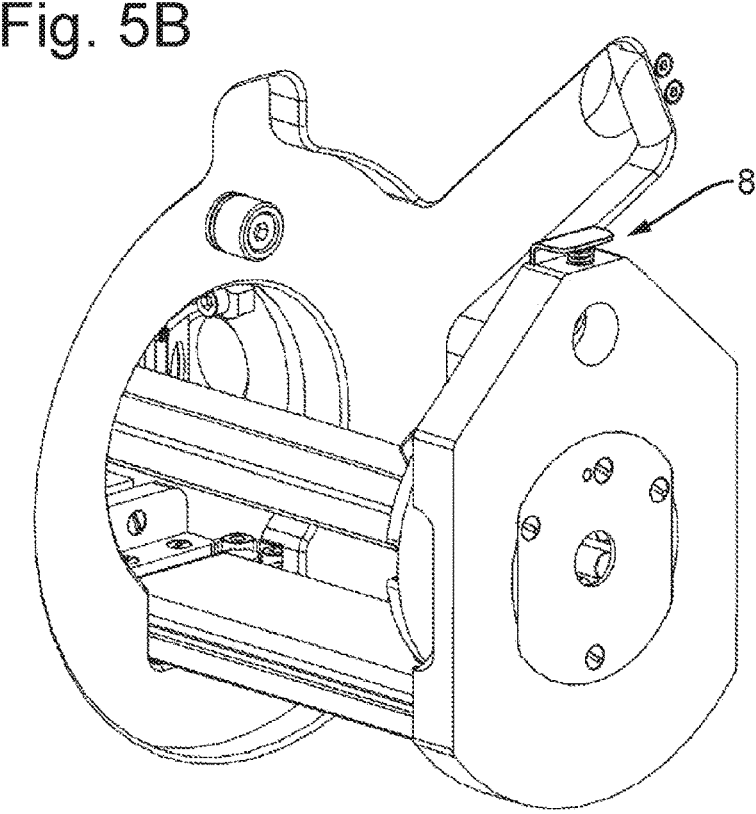

As shown in FIGS. 5A and 5B, the front face of the mass spectrometer or first vacuum chamber may include one or more projections which engage or insert within one or more depressions, apertures or openings provided in a front face, flange or plate of the first ion guide assembly. Alternatively, the front face, flange or plate of the first ion guide assembly may include one or more projections which engage or insert within one or more depressions, apertures or openings provided in the front face of the mass spectrometer or first vacuum chamber.

Other embodiments are contemplated wherein the first ion guide assembly may use a different form of catch or latch mechanism in order to secure the first ion guide assembly in position against or within a front face of the main body of the mass spectrometer housing or to the first vacuum chamber.

One or more apertures and/or ion extraction electrodes may be provided in the front face, flange or plate of the first ion guide assembly through which ions from the ion source are transmitted so that the ions are received by the electrodes forming the first ion guide assembly.

One or more plates or ion extraction electrodes (which may be removable) may be provided in the front face, flange or plate of the first ion guide assembly, wherein the one or more plates have one or more apertures through which ions are arranged to pass in use. The one or more plates or ion extraction electrodes may be electrically conductive and may be arranged to act as an electrode to guide, attract or accelerate ions through the one or more apertures and into the first ion guide.

According to various embodiments the one or more apertures may be sized larger than a differential pumping aperture. According to other embodiments the one or more apertures may be sized so as to form a differential pumping aperture wherein in use the pressure upstream of the aperture is greater than the pressure downstream of the aperture. For example, the pressure upstream of the one or more apertures may be arranged to be at atmospheric or ambient pressure whereas the pressure downstream of the one or more apertures may be arranged to be at sub-atmospheric or sub-ambient pressure. According to an embodiment an ion source comprising a capillary may be located adjacent the aperture provided in the front face, flange or plate of the first ion guide assembly.

Once the isolation valve 1 is closed, the pressure inside the first vacuum chamber or the vacuum chamber containing or housing the first ion guide 2 can be raised to atmospheric pressure or ambient pressure by the opening of a vent valve which may fitted to a vent/pump port in the first vacuum chamber or in a vacuum chamber.

A number of different embodiments are contemplated in terms of how an ion source may be provided adjacent the front end of the mass spectrometer and optionally in relatively close proximity to one or more ion entrance apertures and/or ion extraction electrodes provided in the front face, flange or plate of the first ion guide assembly.

For example, according to various embodiments a MALDI ion source may be provided. The MALDI ion source may be provided within a housing which may form a door assembly with the front end of the mass spectrometer (or other analytical instrument) or a vacuum chamber or the first vacuum chamber.

Once the first ion guide is located in position within the vacuum chamber, the sample analysis chamber door (if present) may then be closed. The first vacuum chamber may then be pumped using a roughing pump via a pumping port included in the first vacuum housing or a housing of a vacuum chamber.

After the pressure in the first vacuum chamber has fallen to a level comparable to the pressure in the ion source, the isolation valve 1 can then be opened, and operation of the instrument can be resumed.

However, it should be understood that many different forms of ion source may be interfaced with the front face of the mass spectrometer or first vacuum chamber and the associated first ion guide assembly positioned or located therewithin.

As well as allowing a rapid means of removal or replacement of an ion guide or ion guide assembly, for cleaning or other purposes, the configuration according to various embodiments also allows alternative configurations of ion guides, ion guide and ion-optic assemblies and atmospheric sampling orifices to be introduced. For example, according to an embodiment an ion guide assembly may be replaced with a collision surface assembly.

According to an embodiment the second assembly which is provided within the vacuum chamber may be arranged to receive different configurations of first ion guide or ion-optic assembly. For example, it is contemplated that a first ion guide assembly comprising a hexapole rod set might be replaced by an ion guide assembly comprising a quadrupole or octopole rod set arrangement.

According to other embodiments a first ion guide assembly comprising ring electrodes, apertured electrodes, rod electrodes or another electrode arrangement might be replaced by a similar arrangement but wherein the internal inscribed radius or ion guiding volume is smaller, larger or has a different profile. Alternatively, quite different ion guide assemblies might be introduced. For example, a multipole rod set ion guide arrangement might be replaced by a different geometry of ion guide such as an ion tunnel or ion funnel ion guide arrangement. Yet further embodiments are contemplated wherein one ion guide arrangement having a certain axial spacing of electrodes might be replaced by another ion guide having a different axial spacing of electrodes. It is also contemplated that one ion guide arrangement having a first form of electrical connection might be replaced by another ion guide arrangement having a second different form of electrical connection. For example, according to an embodiment an ion tunnel arrangement wherein adjacent electrodes are maintained at opposite phases of an AC or RF voltage might be replaced with a different ion tunnel arrangement wherein electrodes are arranged in pairs so that two axially adjacent electrodes are maintained at a first phase of an AC or RF voltage and the next pair of axially adjacent electrodes are maintained at a second different phase of the or an AC or RF voltage.

Figure 6:
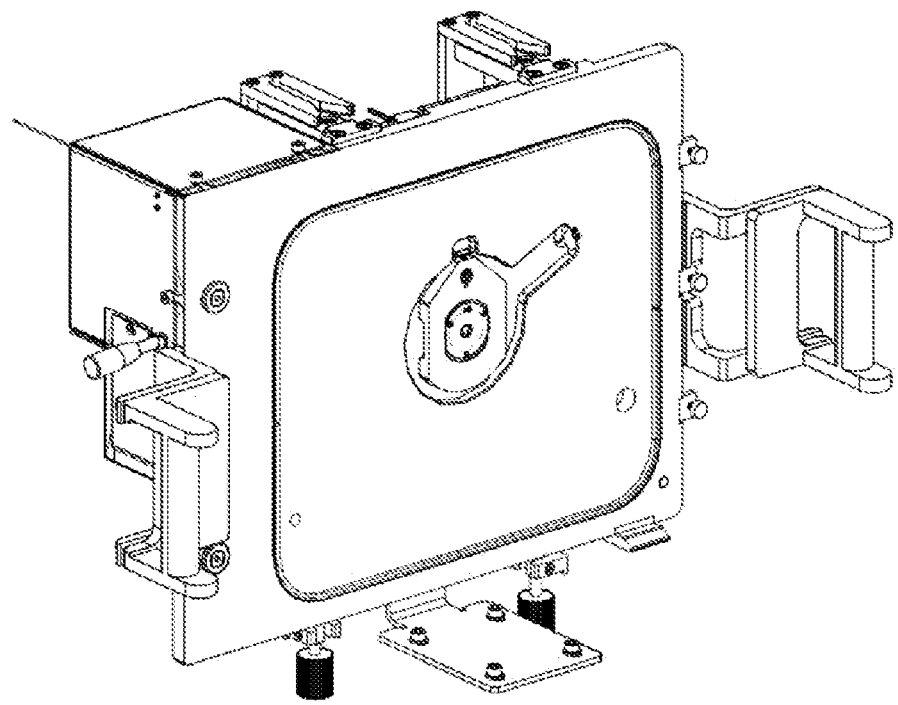
FIG. 6 shows an ion guide assembly located in position and which may be removed by releasing a clip and sliding the ion guide assembly out along guide rails and shows a surface interface between a first vacuum chamber and the front face of a first ion guide assembly.
Figure 6:
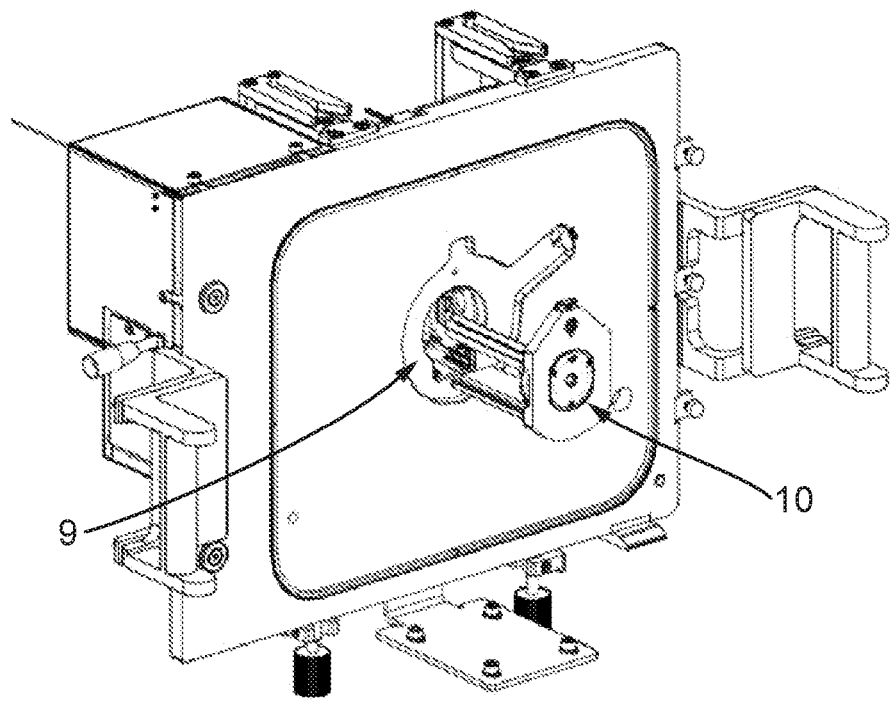

With reference to FIG. 6, the interface 9 between the first vacuum chamber and the front face, flange or plate of the first ion guide may comprise an O-ring sealing arrangement. The first ion guide assembly may comprise an extraction electrode 10 having an aperture through which ions are transmitted in use. The aperture of the extraction electrode 10 presenting to the outside of the first vacuum chamber can be reduced or the extraction electrode 10 may be fitted with a sampling capillary such that the configuration forms a differential pumping aperture between the first vacuum chamber and the surrounding atmosphere.

Embodiments are contemplated wherein the initial electrode of the first ion optic assembly 2 can be modified from a MALDI extraction electrode, designed to operate under vacuum, having a relatively large diameter aperture, to an atmospheric sampling device with a relatively small aperture, which can act as a differential pumping aperture.

Figure 7:
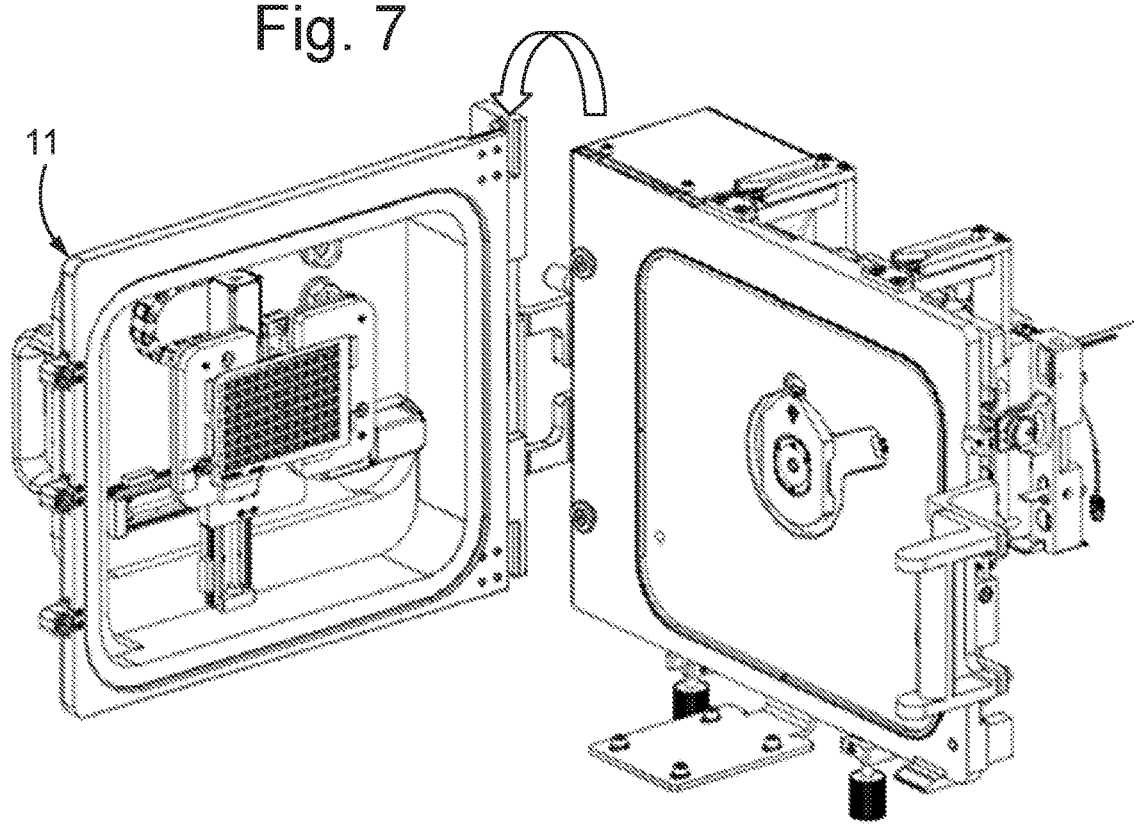
FIG. 7 shows a door assembly which according to various embodiments may contain an x-y stage for a MALDI ion source and wherein the door assembly may be configured to be removable or to be detached so as to enable one or more alternative ion sources to be fitted to the front end of the instrument.

FIG. 7 illustrates that an ion source may be provided in or located within a housing 11. The housing 11 may be maintained at sub-atmospheric pressure and the ion source may comprise a sub-atmospheric pressure ion source. For example, according to various embodiments a MALDI ion source may be provided within the housing 11. The MALDI ion source may comprise a sub-atmospheric pressure ion source. Although a MALDI ion source is shown in FIG. 7, it will be understood that other sub-atmospheric pressure ion sources may be provided instead. Furthermore, other embodiments are contemplated wherein an atmospheric pressure or ambient ion source may be provided within the housing 11.

The housing 11 may be arranged to pivot, rotate, swing or otherwise latch into engagement with the front face of the instrument, mass spectrometer or a vacuum chamber. The housing 11 may open away from the front face of the instrument, mass spectrometer or the vacuum chamber. According to various embodiments the ion source housing 11 may form a door enclosure 11 so that the housing or door enclosure 11 may swing or slide into sealing engagement with the front face of the instrument, mass spectrometer or the vacuum chamber. The door enclosure 11 may have a cam arrangement such that the door enclosure 11 pushes up against the front face of the instrument, mass spectrometer or vacuum chamber in order to seal against it.

According to various embodiments the housing or door enclosure 11 may house a MALDI sample stage. The MALDI sample stage may be operated, in use, at sub-atmospheric pressure.

The housing or door enclosure 11 may be detachable from the front face of the instrument, mass spectrometer or vacuum chamber. In particular, the housing or door enclosure 11 may be arranged so that it can be lifted off or otherwise detached from the front face of the instrument, mass spectrometer or vacuum chamber so as to allow one or more alternative configurations of ion source to be located close to the front face of the instrument, mass spectrometer or vacuum chamber. In particular, one or more alternative configurations of ion source may be positioned or otherwise located close to the front face of the instrument, mass spectrometer or vacuum chamber. For example, one or more alternative ion sources may be positioned so as to abut against or close to the front face of the instrument, mass spectrometer or vacuum chamber. The one or more alternative ion sources may be positioned so as to align the ion source with an ion inlet orifice and optional associated extraction electrode which may be provided in the front face of the instrument, mass spectrometer or vacuum chamber.

It will be apparent, therefore, that in a first mode of operation the housing or door enclosure 11 may be secured to the vacuum chamber so as to align an ion source with an ion inlet orifice. The housing or door enclosure 11 may then be unsecured from the vacuum chamber and a second different ion source may be located or positioned close to the ion inlet orifice.

According to various embodiments the housing or door enclosure 11 may be detached from the front face of the instrument, mass spectrometer or vacuum chamber and may then be manually rotated through 90°. The housing or door enclosure 11 may then be manually re-attached to the front face of the instrument, mass spectrometer or vacuum chamber in order to provide a platform or mounting stage for an ion source.

It will be apparent that the whole initial stage, source or ion source may open or be easily accessible thereby facilitating easy user access.

The door enclosure or mechanism 11 may be arranged to latch or otherwise secure or lock onto the front face of the instrument, mass spectrometer or vacuum chamber so that the interior of the door enclosure forms a fluid tight seal with the front face of the instrument, mass spectrometer or vacuum chamber. As a result, the interior of the housing, door housing or door enclosure or mechanism 11 including, for example, a sample stage provided within the housing may be maintained at sub-atmospheric pressure. The housing or door enclosure 11 may have a first connector or first device which may secure to a second connector or second device provided on the front face of the instrument, mass spectrometer or vacuum chamber. According to various embodiments the housing or door enclosure 11 may have a projection, clip or latch which may secure to a corresponding projection, clip or latch provided on the front face of the instrument, mass spectrometer or vacuum chamber.

It should, however, be understood that the provision of an ion source mounted within a door mechanism and maintained in use at sub-atmospheric pressure is not essential and that various embodiments are contemplated wherein the ion source may comprise an atmospheric pressure ion source.

The housing or door enclosure 11 may enclose a translation stage such as a MALDI translation stage. The translation stage may comprise an x-y translation stage. The translation stage may be arranged to translate a sample or multiple discrete samples in a x-direction and/or a y-direction wherein both the x-direction and the y-direction are orthogonal to a z-direction, wherein the z-direction corresponds to an ion-optic axis. The ion-optic axis (and hence z-direction) may pass through an ion inlet orifice provided in a front face of the instrument, mass spectrometer or vacuum chamber.

A laser beam or laser pulses may be arranged to pass through an ion inlet orifice provided in the front face of the instrument, mass spectrometer or vacuum chamber. The laser beam or laser pulses may be generated by a laser which is located within the instrument, mass spectrometer or vacuum chamber and the laser beam or laser pulses may pass through an ion inlet orifice in a direction towards the housing or door enclosure 11. The laser beam or laser pulses may be arranged to impinge upon a sample or multiple samples which may mounted upon a translation stage located within the housing or door enclosure 11. Accordingly, the translation stage may be arranged to translate the sample or multiple samples relative to the laser beam or laser pulses in order to ionise different portions or sections of the sample or different samples. For example, the translation stage may be arranged to move one or more samples to be analysed relative to the laser beam or laser pulses so that a laser beam or laser pulses are effectively scanned across the surface of a sample or from one sample to another.

Figure 8:
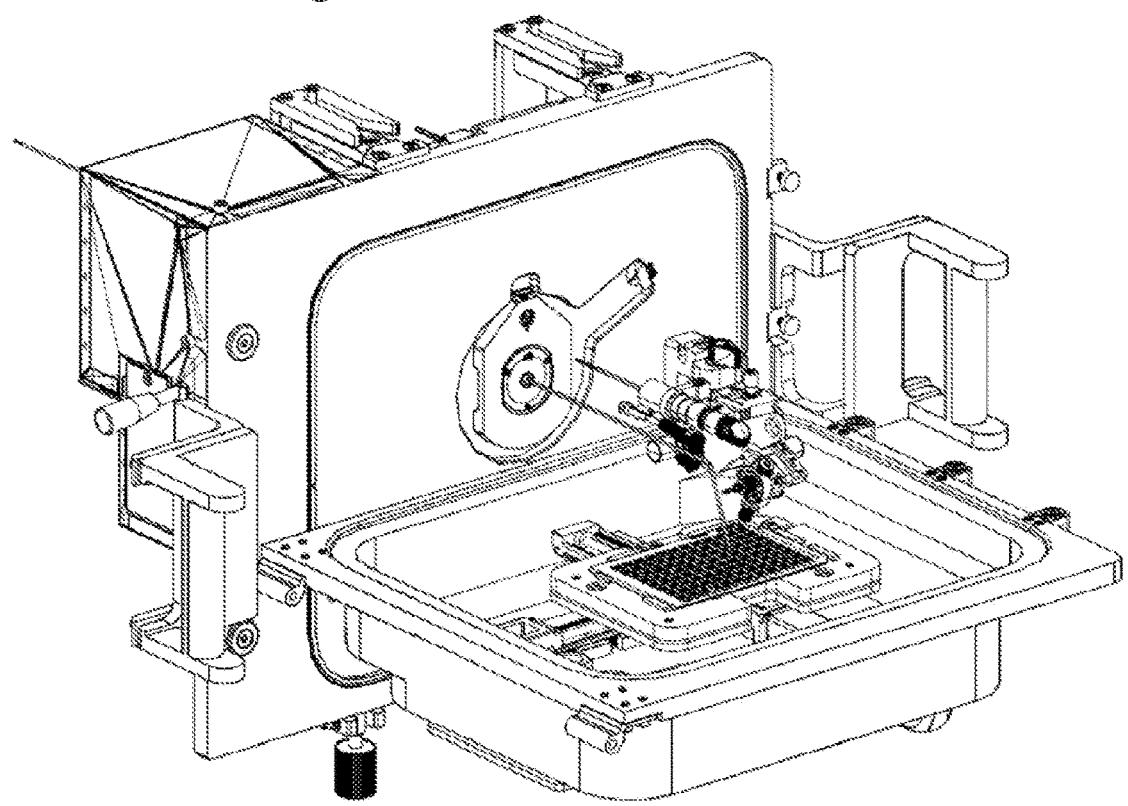
FIG. 8 shows an embodiment wherein a x-y stage is provided so as to allow horizontal motion for atmospheric DESI sample acquisition.

Another feature is shown in FIG. 8 wherein in a second mode of operation the housing or door enclosure 11 may be removed or detached from the front face of the instrument, mass spectrometer or vacuum chamber. The housing or door enclosure 11 may then be manually rotated through 90°. The housing or door enclosure 11 may then be manually re-attached to the front face of the instrument, mass spectrometer or vacuum chamber. Alternatively, the housing or door enclosure 11 may simply be positioned close to the front face of the instrument, mass spectrometer or vacuum chamber without actually being firmly attached to the front face of the instrument, mass spectrometer or vacuum chamber.

It will be apparent that in the second mode of operation the housing or door enclosure 11 may no longer be utilised as a housing or door enclosure. Instead, the housing, door assembly or door enclosure 11 may effectively provide a platform, support or base for a second ion source which may comprise an atmospheric pressure or an ambient ion source.

As shown in FIG. 8, the housing or door enclosure 11 may be configured to open such that a x-y stage or other translation stage can be positioned horizontally providing a platform for alternative atmospheric or ambient sampling techniques. For example, an x-y stage may be provided so as to enable spatial sampling to be employed. Various embodiments are contemplated wherein a Desorption Electrospray Ionisation ("DESI") ion source, a Low Temperature Plasma ("LTP") ion source, a Direct Analysis in Real Time ("DART") ion source, an Inductively Coupled Plasma ("ICP") ion source or other ion source may be provided. In the second mode of operation wherein a second ion source may be provided in a configuration as shown in FIG. 8, then a sample mounted to a translation stage or multiple samples provided on a sample plate may be translated in a x-direction or y-direction, wherein the x-direction and/or y-direction are orthogonal to a z-direction. The z-direction may be parallel to an ion-optic axis which may pass through an ion inlet orifice provided in the front face of instrument, mass spectrometer or vacuum chamber.

Accordingly, in the second mode of operation the translation stage may be translated in a direction parallel to the ion-optic axis and also in a direction perpendicular to the ion-optic axis.

In the first mode of operation when a sub-atmospheric pressure ion source may be operated within the housing or door assembly 11 ions generated by the ion source may be arranged to pass through a first interface. For example, the first interface may comprise an ion inlet orifice together with an extraction electrode. In the second mode of operation when a different ion source is used such as an atmospheric pressure or ambient ion source then ions generated by the ion source may be arranged to pass through a second different interface. The second interface may, for example, comprise a capillary, a nozzle-skimmer interface or an ion inlet orifice together with an extraction electrode. The size of the ion inlet orifice may be different between the first and second modes of operation. Similarly, a different configuration or arrangement of extraction electrodes may be used or provided when switching between the first and second modes of operation.

Although the present invention has been described with reference to preferred embodiments, it will be understood by those skilled in the art that various changes in form and detail may be made without departing from the scope of the invention as set forth in the accompanying claims.

The invention claimed is:

1. Apparatus comprising:
   a vacuum chamber;
   an isolation valve having a curved, spherical, cylindrical or concave portion; and
   a first ion guide, wherein at least a portion of the first ion guide extends, in use, within a swept volume of the isolation valve or within the curved, spherical, cylindrical or concave portion of the isolation valve.

2. Apparatus as claimed in claim 1, wherein the first ion guide comprises a plurality of rod electrodes.

3. Apparatus as claimed in claim 2, wherein at least some of the rod electrodes have a bevelled, curved or non-planar portion or end which is located, in use, adjacent the isolation valve.

4. Apparatus as claimed in claim 1, wherein the first ion guide comprises a ring set ion guide or a plurality of electrodes having apertures through which ions are transmitted in use, wherein electrodes forming the first ion guide have an external diameter or profile and wherein the external diameter or profile of one or more electrodes forming the first ion guide reduces or tapers towards a downstream section of the first ion guide.

5. Apparatus as claimed in claim 1, wherein a downstream end of the first ion guide is located, in use, ≤10 mm from the isolation valve.

6. Apparatus as claimed in claim 1, further comprising a second ion guide, wherein in a mode of operation at least a portion of the isolation valve extends within a portion of the second ion guide.

7. Apparatus as claimed in claim 6, wherein the second ion guide comprises a ring set ion guide or a plurality of electrodes having apertures through which ions are transmitted in use.

8. Apparatus as claimed in claim 1, wherein the first ion guide is located, in use, in the vacuum chamber and wherein the isolation valve is operable to isolate a region downstream of the first ion guide.

9. Apparatus as claimed in claim 1, further comprising an analytical device, a mass analyser or an ion mobility spectrometer arranged downstream of the isolation valve, wherein the isolation valve may be operated so as to maintain the analytical device, the mass analyser or the ion mobility spectrometer at a sub-atmospheric pressure whilst the first ion guide is removed.

10. Apparatus as claimed in claim 1, wherein the isolation valve is rotatable between an open position and a closed position.

11. A method comprising:
    guiding ions through a first ion guide, wherein at least a portion of the first ion guide extends, in use, within a curved, spherical, cylindrical or concave portion of an isolation valve.

12. A method as claimed in claim 11, further comprising operating the isolation valve so as to maintain an analytical device, a mass analyser or an ion mobility spectrometer at a sub-atmospheric pressure whilst the first ion guide is removed.

13. Apparatus comprising:
    a vacuum chamber;
    a housing located within the vacuum chamber and having a guide mechanism; and
    a first ion optic assembly which is slidable or translatable in cooperation with the guide mechanism thereby enabling the first ion optic assembly to be inserted and aligned within the vacuum chamber;
    wherein the first ion optic assembly comprises a first electrical connector and the housing further comprises a second electrical connector, wherein in use insertion of the first ion optic assembly into the vacuum chamber causes the first electrical connector to connect with the second electrical connector.

14. Apparatus as claimed in claim 13, wherein the first ion optic assembly further comprises a sealing member having an ion inlet orifice therewithin, wherein the sealing member is arranged to seal against a front portion of the vacuum chamber.

15. Apparatus as claimed in claim 14, further comprising a releasable latch for at least one of: securing the sealing member against the front portion of the vacuum chamber; and; securing the first ion optic assembly within the vacuum chamber.

16. Apparatus as claimed in claim 1, wherein the vacuum chamber comprises a vacuum chamber ion inlet orifice,
the apparatus further comprising an assembly housing a first sub-atmospheric pressure ion source, wherein in a first mode of operation the assembly may be secured to the vacuum chamber so as to align the first ion source with the vacuum chamber ion inlet orifice and wherein in a second mode of operation the assembly may be detached thereby enabling a second different ion source to be located adjacent the vacuum chamber ion inlet orifice.

17. Apparatus as claimed in claim 16 wherein in the second mode of operation the assembly may be attached to the vacuum chamber or another part of the apparatus.

18. Apparatus as claimed in claim 16, wherein in the second mode of operation the assembly may include a translation stage, wherein the translation stage may be translated in at least one of: a first direction parallel to a direction of ion transmission through the vacuum chamber ion inlet orifice; and a second direction perpendicular to a direction of ion transmission through the vacuum chamber ion inlet orifice.

19. Apparatus as claimed in claim 1, wherein the at least a portion of the first ion guide extends, in use, within the curved, spherical, cylindrical or concave portion of the isolation valve when the isolation valve is closed.

\* \* \* \* \*